United States Patent
Miller et al.

(10) Patent No.: US 11,054,558 B2
(45) Date of Patent: Jul. 6, 2021

(54) PHOTOCHROMIC ARTICLES CONTAINING A POROUS MATERIAL WITH A PHOTOCHROMIC DYE AND FLUID, METHODS OF MAKING AND USING

(71) Applicant: 3M INNOVATIVE PROPERTIES COMPANY, St. Paul, MN (US)

(72) Inventors: Adam D. Miller, St. Paul, MN (US); Donovan G. Weiblen, III, St. Paul, MN (US); William Blake Kolb, Stillwater, MN (US); Thomas P. Klun, Lakeland, MN (US); Richard J. Pokorny, Maplewood, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 106 days.

(21) Appl. No.: 16/342,239

(22) PCT Filed: Nov. 28, 2017

(86) PCT No.: PCT/US2017/063344
§ 371 (c)(1),
(2) Date: Apr. 16, 2019

(87) PCT Pub. No.: WO2018/102266
PCT Pub. Date: Jun. 7, 2018

(65) Prior Publication Data
US 2019/0324178 A1     Oct. 24, 2019

Related U.S. Application Data

(60) Provisional application No. 62/429,263, filed on Dec. 2, 2016.

(51) Int. Cl.
*G02B 5/23* (2006.01)
*G02B 5/22* (2006.01)

(52) U.S. Cl.
CPC ............... *G02B 5/23* (2013.01); *G02B 5/223* (2013.01)

(58) Field of Classification Search
CPC .. G02B 5/23; G02B 5/223; G02B 1/04; Y10T 428/249978; Y10T 428/249981; B01D 71/26; B32B 5/18
See application file for complete search history.

(56) References Cited

U.S. PATENT DOCUMENTS

| | | | |
|---|---|---|---|
| 3,272,646 | A | 9/1966 | Chopoorian |
| 4,125,665 | A | 11/1978 | Bemmels |

(Continued)

FOREIGN PATENT DOCUMENTS

| | | |
|---|---|---|
| WO | WO 2015-148619 | 10/2015 |
| WO | WO 2017-007607 | 1/2017 |

OTHER PUBLICATIONS

Okada, "High-transparency, self-standable gel-SLIPS fabricated by a facile nanoscale phase separation", ACS Appl. Mater. Interfaces, 2014, vol. 6, No. 3, pp. 1502-1508.

(Continued)

*Primary Examiner* — Cara E Rakowski
(74) *Attorney, Agent, or Firm* — Vincent Pham

(57) ABSTRACT

A photochromic article is provided, containing a structural component, a fluid in contact with the structural component, and a photochromic organic dye in contact with the fluid; and a barrier layer disposed on the structural component to provide a barrier for the fluid and photochromic organic dye. The structural component includes a polymeric material that is porous, includes a plurality of cavities, or a combination thereof. A method of changing a light transmission of a photochromic article is provided. A method of forming a photochromic article is also provided.

14 Claims, 5 Drawing Sheets

(56) References Cited

U.S. PATENT DOCUMENTS

| | | |
|---|---|---|
| 4,152,231 A | 5/1979 | St. Clair |
| 4,539,256 A | 9/1985 | Shipman |
| 4,576,850 A | 3/1986 | Martens |
| 4,623,670 A | 11/1986 | Mutoh |
| 4,656,213 A | 4/1987 | Schlademan |
| 4,702,836 A | 10/1987 | Mutoh |
| 4,726,989 A | 2/1988 | Mrozinski |
| 5,238,623 A | 8/1993 | Mrozinski |
| 5,514,120 A | 5/1996 | Johnston |
| 5,728,446 A | 3/1998 | Johnston |
| 5,789,015 A | 8/1998 | Gupta |
| 5,804,610 A | 9/1998 | Hamer |
| 5,812,227 A | 9/1998 | Toshida |
| 5,932,150 A | 8/1999 | Lacey |
| 5,993,954 A | 11/1999 | Radovanovic |
| 6,096,247 A | 8/2000 | Ulsh |
| 6,433,043 B1 | 8/2002 | Misura |
| 6,559,192 B2 | 5/2003 | Maccone |
| 6,632,850 B2 | 10/2003 | Hughes |
| 6,649,249 B1 | 11/2003 | Engle |
| 6,719,812 B1 | 4/2004 | Kitchloo |
| 6,737,170 B2 | 5/2004 | Fitch |
| 6,788,463 B2 | 9/2004 | Merrill |
| 7,084,209 B2 | 8/2006 | Everaerts |
| 7,105,809 B2 | 9/2006 | Wood |
| 7,247,238 B2 | 7/2007 | Mullette |
| 7,718,325 B2 | 5/2010 | Norsten |
| 8,200,061 B2 | 6/2012 | Hirohata |
| 8,202,934 B2 | 6/2012 | Sherman |
| 8,277,899 B2 | 10/2012 | Krogman |
| 8,492,486 B2 | 7/2013 | Sherman |
| 8,808,811 B2 | 8/2014 | Kolb |
| 9,017,819 B2 | 4/2015 | Kues |
| 2002/0136899 A1* | 9/2002 | deROJAS ............... G02B 5/23 428/412 |
| 2008/0160283 A1 | 7/2008 | Wiand |
| 2009/0161058 A1 | 6/2009 | Sherman |
| 2011/0092606 A1 | 4/2011 | Zhou |
| 2012/0100326 A1 | 4/2012 | Sherman |
| 2012/0295025 A1 | 11/2012 | Sherman |
| 2012/0321911 A1 | 12/2012 | Watanabe |
| 2013/0108858 A1 | 5/2013 | Biteau |
| 2013/0122221 A1 | 5/2013 | Colton |
| 2013/0316076 A1 | 11/2013 | Sherman |
| 2013/0337260 A1 | 12/2013 | Tapio |
| 2014/0220362 A1 | 8/2014 | Milliron |
| 2014/0290732 A1 | 10/2014 | Aizenberg |
| 2015/0024126 A1 | 1/2015 | Hernando Campos |
| 2018/0194994 A1* | 7/2018 | Miller .................. G02B 5/23 |

OTHER PUBLICATIONS

Miranda, "Physically and chemically stable ionic liquid-infused textured surfaces showing excellent dynamic omniphobicity", APL Mater. 2014, vol. 2, pp. 056108-06.
Bobrovsky, "Photochromic composites based on porous stretched polyethylene filled by nematic liquid crystal mixtures", polymers advanced technologies, 2010, vol. 21, pp. 100-112.
International Search report for PCT International Application No. PCT/US2017/063344 dated Mar. 14, 2018, 5 pages.

* cited by examiner

PHOTOCHROMIC ARTICLES CONTAINING A POROUS MATERIAL WITH A PHOTOCHROMIC DYE AND FLUID, METHODS OF MAKING AND USING

CROSS REFERENCE TO RELATED APPLICATIONS

This application is a national stage filing under 35 U.S.C. 371 of PCT/US2017/063344, filed Nov. 28, 2017, which claims the benefit of U.S. Application No. 62/429,263, filed Dec. 2, 2016, the disclosure of which is incorporated by reference in its/their entirety herein.

BACKGROUND

There is a need in the art for improved photochromic articles such as windows, coatings, films, and optical elements. Most successful commercial applications of photochromic articles are related to ophthalmic lenses that darken in the sun and return to their initial transparency in typical indoor light. Some niche markets include the security ink and the entertainment/toy markets. There are technical challenges that prevent this technology from entering the vehicles, windows, and structural glass markets. Such challenges include durability, fatigue, and switching time. The organic dyes that have been used in a majority of the photochromic systems are degraded by light and oxygen. Thus, their lifetimes suffer. There is a need for new materials with the traits desired for use in a photochromic system, such as that designed for window applications.

SUMMARY

The present disclosure provides photochromic articles, methods for making photochromic articles containing a photochromic organic dye, and methods for changing the light transmission or light reflectance of photochromic articles.

In a first aspect, the present disclosure provides a photochromic article. The photochromic article contains a structural component, a fluid in contact with the structural component, and a photochromic organic dye in contact with the fluid. The structural component includes a polymeric material that is porous, includes a plurality of cavities, or both. A barrier layer is disposed on the structural component to provide a barrier for the fluid and photochromic organic dye (e.g., to reduce the mobility of the photochromic organic dye and the fluid out of, and/or away from, the structural component).

In a second aspect, the present disclosure provides a method of forming a photochromic article. The method includes distributing a photochromic organic dye in a fluid and placing the fluid in contact with a structural component. The structural component includes a polymeric material that is porous, includes a plurality of cavities, or a combination thereof. The method also includes placing a barrier layer on the structural component to provide a barrier for the fluid and photochromic organic dye (e.g., to reduce the mobility of the photochromic organic dye and the fluid out of, and/or away from, the structural component).

In a third aspect, the present disclosure provides a method of changing the light transmission of a photochromic article. The method includes providing a photochromic article as described herein and exposing the photochromic article to light wavelengths of 300 nanometers (nm) to 400 nm for a time of at least 2 minutes such that the article exhibits a difference in transmission of at least 2%, and in certain embodiments, a difference in transmission of at least 5%, or at least 10%. Various unexpected results and advantages are obtained in exemplary embodiments of the disclosure. One such advantage of exemplary embodiments of the present disclosure is the speed of photochromic cycling of the article upon exposure to light irradiation and subsequent cessation of the irradiation, which can be in the range of seconds to minutes.

Glossary

For the following Glossary of defined terms, these definitions shall be applied for the entire application, unless a different definition is provided in the claims or elsewhere in the specification.

Certain terms are used throughout the description and the claims that, while for the most part are well known, may require some explanation. It should be understood that, as used herein:

The term "fluid" refers to a liquid, a solution, or a dispersion of solid or liquid in a liquid.

The term "nanoporous" refers to a porous material having pores with an average effective diameter from about 1 nanometer (nm) to about 1000 nm.

The term "microporous" refers to a porous material having pores with an average effective diameter of less than 2 nm.

The term "mesoporous" refers to a porous material having pores with an average effective diameter between 2 nm and 50 nm.

The term "macroporous" refers to a porous material having pores with an average effective diameter greater than 50 nm.

The term "photochromic article" refers to an article which reversibly changes its absorption properties (i.e., color) caused by a photochemical reaction within the material upon exposure to specific wavelengths of electromagnetic radiation. In the present text, the term shall be applied to articles which exhibit a reversible change in transmission or reflection of 2% or more.

The term "transparent" refers to an article that has a light transmission, over an entire wavelength range of 390 nm to 700 nm, of at least 2%, or at least 5%, or at least 10%, or at least 15%, or at least 20%, or at least 30%, or at least 40%, or at least 50%, or at least 60%, or at least 70%, or at least 80%, or at least 90%, or up to 100%, or up to 99%, or up to 98%, or up to 95%, or up to 92%.

The term "opaque" refers to an article that has a light transmission, over an entire wavelength range of 390 nm to 700 nm, of less than 2%, less than 1%, less than 0.5%, or even less than 0.1%.

The phrase "ceasing the exposing to the light wavelengths" means the absence of the light wavelengths irradiating a material following the presence of light wavelengths irradiating the material. In certain embodiments, turning off a lamp is ceasing the exposing to the light wavelengths, whereas in certain embodiments, the sun setting is ceasing the exposing to the light wavelengths.

The term "aliphatic group" means a saturated or unsaturated linear or branched hydrocarbon group. This term is used to encompass alkyl, alkenyl, and alkynyl groups, for example.

As used herein, "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, and 1,4-cyclohexyldimethylene.

The term "alicyclic group" means a cyclic hydrocarbon group having properties resembling those of aliphatic groups.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "heteroalkyl group" means an alkyl group having at least one $—CH_2—$ replaced with a heteroatom such as $NR^a$, O, or S, wherein W is H or an aliphatic group.

The term "heterocyclic group" means a cyclic aliphatic group having at least one $—CH_2—$ replaced with a heteroatom such as $NR^a$, O, or S, wherein W is H or an aliphatic group.

The term "heteroaryl group" means an aryl group having at least one $—CH_2—$ replaced with a heteroatom such as N, O, or S.

The term "amine group" means an organic group containing a nitrogen atom. The N of these amine groups may be substituted with aliphatic or alicyclic groups, or be part of a heterocyclic group or heteroalkylene group.

The term "(meth)acrylic" or "(meth)acrylate" is inclusive of both acrylic and methacrylic (or acrylate and methacrylate).

The term "silyl" refers to a monovalent group of a formula $—Si(R^b)_3$ where $R^b$ is hydroxyl, a hydrolyzable group (e.g., an alkoxy group such as $—OCH_3$), or a non-hydrolyzable group (e.g., an alkyl group such as $—CH_3$). In many embodiments, the silyl group is a "reactive silyl" group, which means that the silyl group contains at least one $R^b$ group that is a hydroxyl group or hydrolyzable group. Some reactive silyl groups are of formula $—Si(R^c)_{3-x}(R^d)_x$ where each group $R^c$ is independently hydroxyl or a hydrolyzable group and each group $R^d$ is independently a non-hydrolyzable group. The variable x is an integer equal to 0, 1, or 2.

When a group is present more than once in a formula described herein, each group is "independently" selected, whether specifically stated or not. For example, when more than one R group is present in a formula, each R group is independently selected.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" in dictates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "copolymer" refers to polymers containing two or more different monomers.

As used in this specification and the appended embodiments, the singular forms "a", "an", and "the" include plural referents unless the content clearly dictates otherwise. Thus, for example, reference to components containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g., 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Reference throughout this specification to "one embodiment," "certain embodiments," "some embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof. The below disclosure relates to each the first aspect, the second aspect, the third aspect, and the fourth aspect.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The disclosure may be more completely understood in consideration of the following detailed description of various embodiments of the disclosure in connection with the accompanying figures, in which.

While the above-identified figures, which may not be drawn to scale, relate to certain embodiments of the present disclosure, other embodiments are also contemplated, as noted in the Detailed Description.

DETAILED DESCRIPTION

As noted above, technical challenges prevent photochromic technology from entering various commercial markets, including challenges such as durability, fatigue, and switching time. The organic dyes that have been used in a majority of the photochromic systems are degraded by light and oxygen. The present disclosure provides photochromic articles, methods for making photochromic articles, and methods for changing the light transmission of photochromic articles.

Photochromic organic dyes are provided that exhibit reversible photochromism and are suitable for use with fluids, for example, fluids that have the proper polarity to give photochromic articles of high optical quality and photochromic performance.

In one aspect, the present disclosure provides a photochromic article that includes a structural component; a fluid in contact with the structural component; a photochromic organic dye in contact with the fluid; and a barrier layer disposed on the structural component to provide a barrier for the fluid and photochromic organic dye therein. The structural component includes a polymeric material that is porous, includes a plurality of cavities, or a combination thereof. It has been discovered that contacting the photochromic organic dye with a fluid decreases the time needed for photochromic cycling.

In certain embodiments, the article is photochromic. In certain embodiments, the photochromic article is transparent.

In certain embodiments, at least a portion of the photochromic organic dye is dissolved in the fluid. In certain embodiments, at least a portion of the photochromic organic dye is dispersed in the fluid. In certain embodiments, at least a portion of the photochromic organic dye is bound to the structural component. An example of a photochromic dye that can be bound to the structural component includes a terminal alkene functionality or an acrylate functionality. In certain embodiments, at least a portion of the photochromic organic dye is dispersed in the fluid and at least a portion of the photochromic organic dye is bound to the structural component.

Figure 1:
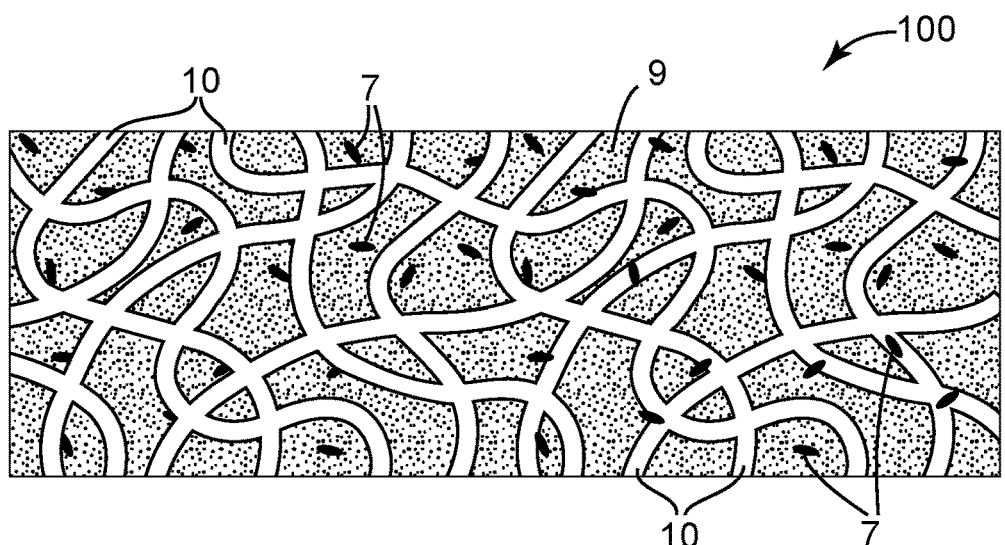
FIG. 1 is a schematic cross-sectional view of an exemplary photochromic article according to the disclosure.

Referring to FIG. 1, a schematic cross-sectional view of a photochromic article is provided. The transparent photochromic article 100 contains a structural component 10, a fluid 9 in contact with the structural component 10, and a photochromic organic dye 7 in contact with the fluid. The structural component 10 includes a porous polymeric material.

Structural Component

The structural component includes a polymeric material that is porous, includes a plurality of cavities, or a combination thereof.

Suitable porous polymeric materials include, for example, and without limitation a nanoporous film, a microporous film, a mesoporous film, a macroporous film, or a film including micropores, mesopores, macropores, or a combination thereof.

The porous polymeric material includes an average pore diameter that ranges from ten angstroms up to ten micrometers, which encompasses nanoporous materials, microporous materials, mesoporous materials, as well as macroporous materials. Some suitable porous polymeric materials include nanovoided articles as disclosed in U.S. Pat. No. 8,808,811 (Kolb et al.), and Thermally Induced Phase Separation (TIPS) membranes. The pore size of TIPS membranes can be generally controlled due to the ability to select the extent of stretching of the membrane material. TIPS membranes are relatively inexpensive to make, and methods for making them are known to the skilled practitioner. For example, various membranes and methods are described in detail in U.S. Pat. No. 4,539,256 (Shipman), U.S. Pat. No. 4,726,989 (Mrozinski), U.S. Pat. No. 5,238,623 (Mrozinski), U.S. Pat. No. 5,993,954 (Radovanovic et al.), and U.S. Pat. No. 6,632,850 (Hughes et al.), and U.S. Pat. Appl. Pub. No. 2011/0092606 (Zhou).

Porous polymeric materials for use in aspects of the present disclosure also include Solvent Induced Phase Separated (SIPS) membranes and other microporous membranes made by extrusion, extrusion/stretching and extrusion/stretching/extraction processes, and track etching processes. Suitable membranes that may be formed by SIPS include, for example and without limitation, polyvinylidene fluoride (PVDF), polyether sulfone (PES), polysulfone (PS), polyacrylonitrile (PAN), nylon (i.e., polyamide), cellulose acetate, cellulose nitrate, regenerated cellulose, and polyimide. Suitable materials that may be formed by track etching processes include, for example and without limitation, polycarbonate and polyester. Suitable materials that may be formed by stretching techniques include, for example and without limitation, polytetrafluoroethylene (PTFE) and polypropylene.

In certain embodiments, a porous polymeric material includes ethylene chlorotrifluoroethylene (ECTFE). Useful ECTFE membranes may be prepared according to U.S. Pat. No. 4,623,670 (Mutoh et al.), U.S. Pat. No. 4,702,836 (Mutoh et al.), U.S. Pat. No. 6,559,192 (Maccone et al.), U.S. Pat. No. 7,247,238 (Mullette et al.), and U.S. Pat. No. 8,200,061 (Mrozinski et al.). A suitable ECTFE membrane is commercially available under the trade designation PFCO20-ECTFE 0.2 UM from 3M Company (St. Paul, Minn.).

In some embodiments, suitable polymers for porous polymeric materials include, for example and without limitation, an aliphatic polyurethane, an acrylic, a polyester, a polyimide, a polyamide, an epoxy polymer, a polystyrene, a silicone-containing polymer, a fluorinated polymer, or a combination thereof.

When the structural component includes a plurality of cavities, the structural component typically includes a plurality of interior cavities (e.g., wells, pockets, regions, etc.), at least one of the cavities including a channel, or a combination thereof. Structural components having a structured surface region generally include a combination of protrusive features and intrusive features. Some of these features can function to exclude, retain, or provide for a combination of excluding or retaining fluid compositions disposed onto a structured surface region. The surfaces of the protrusive or intrusive features can be smooth, partially smooth, textured, or a combination thereof. The features can be nano-replicated, micro-replicated, macro-replicated, and the like. Some structured surface regions can include nano-replicated, micro-replicated, and macro-replicated features and patterns as described in U.S. Pat. No. 6,649,249 (Engle et al.) and U.S. Pat. No. 7,105,809 (Wood et al.).

One illustrative method for replicating the surface structural features of a master mechanical tool into the surface of another material is through thermal embossing (e.g., as described in U.S. Pat. No. 6,096,247 (Ulsh et al.) and U.S. Pat. No. 5,932,150 (Lacey)). For the preparation of thermally embossed materials, it is often convenient and useful to start with material in film form. Optionally, a film for embossing can include multiple layers (e.g., as described in U.S. Pat. No. 6,737,170 (Fitch et al.) and U.S. Pat. No. 6,788,463 (Merrill et al.)). Another approach for replicating the surface structure of a master mechanical tool into the surface of polymer is to cure a flowable precursor to the polymer while in contact with the master mechanical tool. Generally, a precursor to the cured polymer can be cast onto a master mechanical tool or into a mold, followed by curing (e.g., as described in U.S. Pat. No. 4,576,850 (Martens)). Hence, in some embodiments, the structural component includes an embossed polymer, a molded polymer, or a combination thereof.

In some embodiments, the structured surface region of the substrate can include regular or random features. These features can be spatially located throughout the structured surface region.

Fluids

When in contact with the fluid, typically at least a portion of the photochromic organic dye is dissolved in the fluid, at least a portion of the photochromic organic dye is dispersed in the fluid, at least a portion of the photochromic organic dye is bound to the structural component, or a combination thereof. Advantageously, in most embodiments the fluid provides a transparent medium for faster dye kinetics (i.e., coloration and fading) versus a polymer matrix. Polymers with a high modulus, such as polycarbonate, polyethylene terephthalate (PET), poly(methyl methacrylate) (PMMA), polystyrene, and acrylonitrile butadiene styrene, can lead to reduced photochromic response; the matrix can be too stiff to allow the photochromic dyes to rearrange into their colored or colorless states. The approach taken with the compositions of the present disclosure includes decoupling the photochromic reaction from the supporting polymer matrix.

In some embodiments of photochromic articles of the present disclosure, the fluid includes a compound having a solubility parameter of 7 $(cal/cm^3)^{1/2}$ to 12.5 $(cal/cm^3)^{1/2}$. In some embodiments of photochromic articles of the present disclosure, the fluid includes a compound that is aprotic. In some embodiments of photochromic articles of the present disclosure, the fluid includes a compound having a solubility parameter of 7 $(cal/cm^3)^{1/2}$ to 12.5 $(cal/cm^3)^{1/2}$ and is aprotic.

In some embodiments, the fluid includes a polyalkylene oxide, a polysiloxane (e.g., a polydimethylsiloxane (PDMS)), a solvent having a boiling point of 200° C. or higher at atmospheric pressure, or a combination thereof.

In some embodiments, the fluid includes a polyalkylene oxide, a polysiloxane, or a combination thereof (e.g., mixture or copolymer thereof). An example of a combination is a dimethylsiloxane-ethylene oxide copolymer.

A high boiling solvent assists in minimizing evaporation of the fluid from the article over time. Such high boiling solvent typically has a boiling point of 200° C. or higher at atmospheric pressure. Examples of solvents having a boiling point of 200° C. or higher at atmospheric pressure include those selected from di(2-ethylhexyl) adipate, tributyl phosphate, dibutyl sebacate, and a combination thereof.

In some embodiments, the fluid includes a polyalkylene oxide. A suitable polyalkylene oxide includes polyethylene glycol (PEG) having a molecular weight less than or equal to 600 grams per mole (g/mol), such as less than or equal to 400 g/mol, or less than or equal to 200 g/mol. In some embodiments, the fluid is a component of a gel including a crosslinked polyalkylene oxide.

In some embodiments, the fluid includes a polysiloxane. Examples of suitable polysiloxanes include polydimethylsiloxane, polyphenylmethylsiloxane, polydiphenylsiloxane, diphenylsiloxane-dimethylsiloxane copolymer, and vinylmethylsiloxane-dimethylsiloxane copolymer. In general, siloxanes are liquids at room temperature, regardless of molecular weight.

Photochromic Dyes

The proportion, concentration, or amount of photochromic organic dye provided in the articles of the present disclosure is not particularly limited, although certain amounts are preferred for various applications. In some embodiments, the articles include at least 0.05 percent by weight (wt-%) of the photochromic organic dye. In some embodiments, the articles include up to 20 wt-% of the photochromic organic dye. If the amount of photochromic organic dye in the article is too low, the article may not exhibit sufficient photochromism. If the amount of photochromic organic dye in the article is too high, the photochromic organic dye could precipitate large crystals or hinder the fluidity of the fluid. Based on the teachings herein, and depending on the formulation, one of skill in the art can determine the appropriate amount of photochromic organic dye.

In some embodiments, the photochromic organic dye is selected from a spiropyran, spirooxazine, a naphthopyran, and a combination thereof.

In some embodiments, the photochromic organic dye is a spiropyran or spirooxazine of Formula (I):

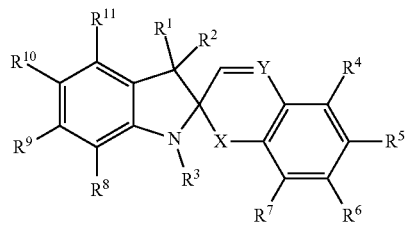

wherein:
X is NH, O, or S;
Y is N or CH;
each of $R^1$, $R^2$, and $R^3$ independently represents:
hydrogen, a (C1-C6)alkyl, or a (C3-C6)cycloalkyl;
each of $R^4$ through $R^{11}$ independently represents:
hydrogen, an aliphatic group, an alicyclic group, an aryl group (e.g., phenyl), an alkaryl group, an aralkyl group, a silyl group, an (—NO$_2$) group, a (—CN) group, a halo group, an (—NH$_2$) group, an amine group, an (—OH) group, a heteroalkyl group, a heteroaryl group, a heterocyclic group, an aliphatic oxy group, an alicyclic oxy group, an aryloxy group, an arylthio group, a (—C(O)H) group, a (—C(O)OH) group, an (—SO$_3$R') group, wherein R' is H or a monovalent cation (e.g., alkali metal cation), an $R^A$—C(O)— group, an $R^A$—C(O)—O— group, an $R^A$—O—C(O)— group, an $R^A$—C(O)—NH— group, and an $R^A$—N(H)—C(O)— group, wherein $R^A$ is an aryl group, a (C1-C10)aliphatic group, or a (C3-C10)alicyclic group;
wherein the aliphatic group, alicyclic group, aryl group, alkaryl group, aralkyl group, amine group, and $R^A$ groups may be substituted with any of the groups defined for the through $R^{11}$ groups; and
wherein adjacent $R^4$ through $R^{11}$ groups, or any adjacent positions within the $R^4$ through $R^{11}$ alicyclic or heterocyclic groups, may be joined to create a fused ring (e.g., a six-membered aromatic ring) wherein the ring may be substituted with any of the groups defined for the through $R^{11}$ groups. (For example, if $R^6$ is a five-member nitrogen heterocycle with two substituents, the two substituents may be joined to form a fused ring to the five-member nitrogen heterocycle.)

In some embodiments, the spiropyran or spirooxazine of Formula (I) is selected from:

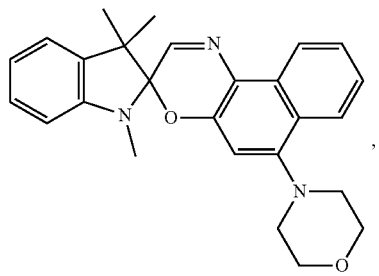

CAS #114747-48-7

,

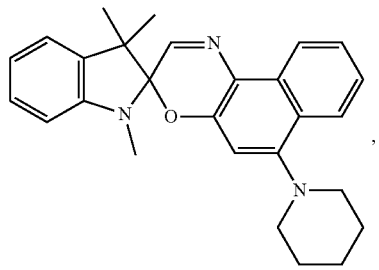

CAS #114747-45-4

,

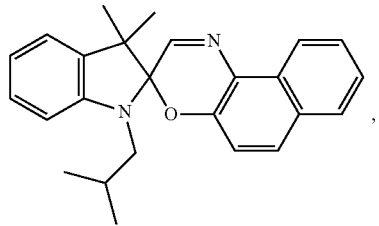

CAS #124956-65-6

,

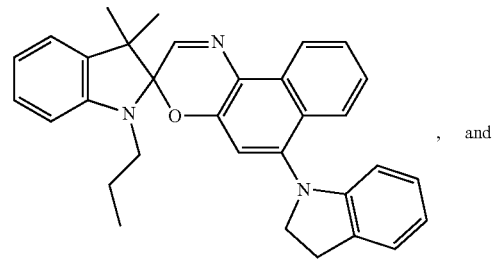

CAS #276670-70-3

, and

-continued

CAS #1715932-70-9

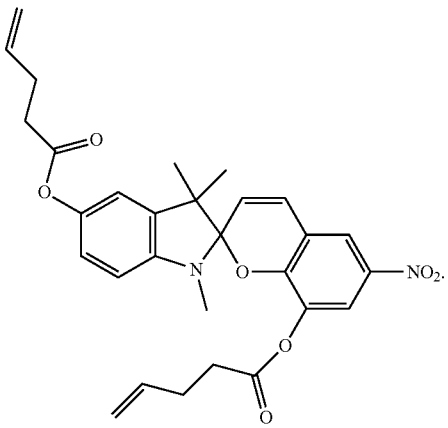

In some embodiments, the spirooxazine of Formula (I) is 6'-(2,3-dihydro-1H-indole-1-yl)-1,3-dihydro-3,3-dimethyl-1-propyl-spiro(2H-indole-2,3'-[3H]-naphtho-(2,1-b)-(1,4)-oxazine (CAS #276670-70-3) or 1'-isobutyl-3',3'-dimethyl-spiro[benzo[f][1,4]benzoxazine-3,2'-indoline] (CAS #124956-65-6).

In some embodiments, the photochromic organic dye is a naphthopyran of Formula (II):

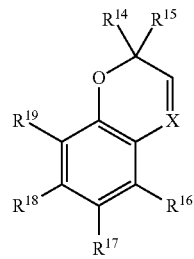

wherein:
X is N or CH;
each of $R^{14}$ through $R^{19}$ independently represents:
hydrogen, an aliphatic group, an alicyclic group, an aryl group (e.g., phenyl), an alkaryl group, an aralkyl group, a silyl group, an (—$NO_2$) group, a (—CN) group, a halo group, an (—$NH_2$) group, an amine group, an (—OH) group, a heteroalkyl group, a heteroaryl group, a heterocyclic group, an aliphatic oxy group, an alicyclic oxy group, an aryloxy group, an arylthio group, a (—C(O)H) group, a (—C(O)OH) group, an (—$SO_3R'$) group, wherein R' is H or a monovalent cation (e.g., alkali metal cation), an $R^4$—C(O)— group, an $R^4$—C(O)—O— group, an $R^4$—O—C(O)— group, an $R^4$—C(O)—NH— group, and an $R^4$—N(H)—C(O)— group, wherein $R^4$ is an aryl group, a (C1-C10)aliphatic group, or a (C3-C10)alicyclic group;
wherein the aliphatic group, alicyclic group, aryl group, alkaryl group, aralkyl group, amine group, and $R^4$ groups may be substituted with any of the groups defined for the $R^{14}$ through $R^{19}$ groups; and
wherein adjacent $R^{16}$ through $R^{19}$ groups, or any adjacent positions within the $R^{19}$ through $R^{19}$ alicyclic or heterocyclic groups, may be joined to create a fused ring (e.g., a six-membered aromatic ring) wherein the ring may be substituted with any of the groups defined for the $R^{14}$ through $R^{19}$ groups.

In some embodiments, the naphthopyran of Formula (II) is selected from:

CAS #4222-20-2

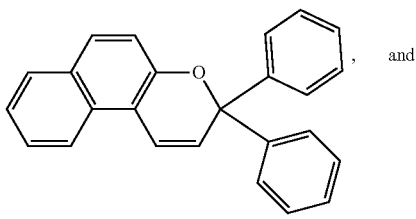
, and

CAS #263026-66-0

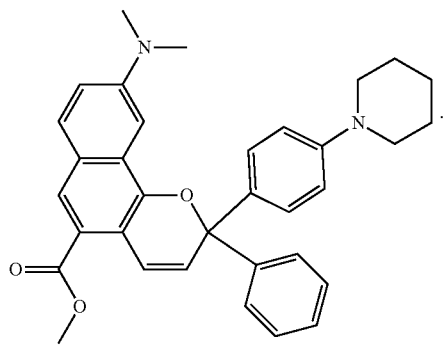

In some embodiments, the naphthopyran of Formula (II) is methyl 9-(dimethylamino)-2-phenyl-2-[4-(1-piperidyl)phenyl]benzo[h]chromene-5-carboxylate (CAS #263026-66-0).

Optional Additives

The articles of the present disclosure may also contain one or more conventional additives. Preferred additives include tackifiers, plasticizers, dyes, antioxidants, and UV stabilizers. Such additives can be used in various combinations and for various effects, if they do not affect the photochromic properties of the article. Based on the teachings herein, and depending on the effect(s) desired, one of skill in the art can determine the appropriate type(s) and amount(s) of additives.

Barrier Layers

Photochromic articles of the disclosure include a barrier layer that reduces mobility of the fluid and dye out of the structural component. By this it is meant that the barrier layer may, for example, reduce the mobility of the photochromic organic dye and the fluid out of, and/or away from, the structural component. Such layer may also provide at least some protection to the surface of the structural component from potentially damaging contact.

In some embodiments, the barrier layer is in the form of a coating (i.e., a top coat). In some embodiments, the barrier layer is in the form of a barrier film. Such barrier film can be applied to the structural component by, e.g., lamination or through the use of an adhesive.

Such barrier layers typically exhibit an initial haze, according to the Optical Measurement Procedure in the Examples Section, of less than 2% and/or an initial transmission, according to the Optical Measurement Procedure in the Examples Section, of at least 90%.

In some embodiments, the barrier layer includes a cross-linked material. Exemplary materials capable of cross-linking include, for example, multi-functional (meth)acrylates, polyesters, epoxies, fluoropolymers, urethanes, siloxanes, and blends or copolymers thereof.

In some embodiments, the barrier layer includes a UV-cured system.

In some embodiments, the barrier layer includes a polymerized multifunctional (meth)acrylate (i.e., an acrylate or a methacrylate) and/or a urethane (meth)acrylate. Such barrier layers are coatings that are applied out of a resin-containing top coating solution (i.e., coating solution or resin-containing coating solution or top coating solution) that includes one or more multifunctional (meth)acrylates or urethane (meth)acrylates and one or more solvent(s), removing the solvent(s), and exposing the multifunctional (meth) acrylate(s) or urethane (meth)acrylates to UV radiation.

Exemplary multifunctional (meth)acrylates include pentaerythritol triacrylate, pentaerythritol tetraacrylate, 1,3-butylene glycol diacrylate, 1,4-butanediol diacrylate, 1,6-hexanediol diacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, diethylene glycol diacrylate, dipropylene glycol diacrylate, ethoxylated bisphenol A diacrylate, glycerol triacrylate, trimethylolpropane triacrylate, ethoxylated triacrylate, propoxylated triacrylates, tris(2-hydroxyethyl)isocyanurate triacrylate, ditrimethylolpropane tetraacrylate, dipentaerythritol pentaacrylate, ethoxylated pentaerythritol tetraacrylate, and caprolactone modified dipentaerythritol hexaacrylate. Various combinations may be used if desired.

Exemplary urethane (meth)acrylates can be prepared from one or more hydroxyalkyl (meth)acrylates (i.e., acrylates or methacrylates), optionally one or more other hydroxyl-containing compounds, and one or more multifunctional isocyanates. Examples of hydroxyalkyl (meth) acrylates include those having 2 to 4 carbon atoms in the alkyl group, such as for example, hydroxyethyl methacrylate, hydroxyethyl acrylate, hydroxypropyl acrylate, hydroxypropyl methacrylate, hydroxybutyl acrylate, and hydroxybutyl methacrylate. The optional other hydroxyl-containing compounds are, more particularly, monohydric to trihydric aliphatic alcohols of low molecular mass, preferably having 1 to 20 carbon atoms, such as, for example, methanol, ethanol, n-hexanol, isooctanol, isododecanol, benzyl alcohol, ethylene glycol, diethylene glycol, propylene glycol, glycerol, or alcohols obtained from these alcohols by alkoxylation. Exemplary multifunctional isocyanates are selected from hexamethylene diisocyanate, hexamethylene diisocyanate oligomers such as isocyanurates (such as those available under the tradenames DESMODUR N3300 and DESMODUR N3600 from Bayer), hexamethylene diisocyanate oligomers such as biurets (e.g., that available under the tradename DESMODUR N100 available from Bayer), bis(4-isocyanatocyclohexyl) methane, isophorone diisocyanate, toluene diisocyanate, methane diphenyldiisocyanate, and a combination thereof. Preparation of such urethane acrylates are described, for example, in U.S. Pat. No. 9,017,819 (Kues et al.).

Exemplary solvents used in preparing urethane acrylates which may be used in a resin-containing top coating solution include ester solvents, such as butyl acetate and ethyl acetate, and ketone solvents such as acetone, methyl ethyl ketone, and methyl isobutyl ketone. Exemplary isocyanate reactive solvents, which are not used in the urethane acrylate preparation, but which may be used in a resin-containing top coating solution (i.e., coating solution) include alcohols, such as ethanol, isopropanol, and 1-methoxy-2-propanol.

In some embodiments, the barrier layer includes a thermally cured system.

In some embodiments, the barrier layer includes a hydrosilylation-cured polysiloxane (e.g., a polydimethylsiloxane (PDMS)). In some embodiments, the barrier layer is deposited out of a resin-containing coating solution that includes a vinyl-containing polysiloxane and a hydride-containing polysiloxane. In some embodiments, the barrier layer is deposited out of a resin-containing top coating solution (i.e., coating solution) that includes one or more vinyl-containing polysiloxanes, one or more hydride-containing polysiloxanes, a ligand-supported platinum catalyst, and one or more solvent(s) (e.g., toluene or xylene). The solvent(s) are removed and the resultant reaction mixture is exposed to thermal energy (e.g., 60° C.).

Exemplary vinyl-containing siloxanes include vinyl-terminated polydimethylsiloxane, vinyl-terminated polyphenylmethylsiloxane, vinyl-terminated polydiphenylsiloxane, vinyl-terminated diphenylsiloxane-dimethylsiloxane copolymer, and vinylmethylsiloxane-dimethylsiloxane copolymer. Various combinations of such siloxanes may be used if desired.

Exemplary hydride-containing polysiloxanes include dimethylsiloxane-methylhydrosiloxane copolymer, hydride-terminated polydimethylsiloxane, polymethylhydrosiloxane, and methylhydrosiloxane-phenylmethylsiloxane copolymer. Various combinations of such siloxanes may be used if desired.

Exemplary ligand-supported platinum catalysts include platinum(0)-1,3-divinyl-1,1,3,3-tetramethyldisiloxane, [1,3-bis(2,6-diisopropylphenyl)imidazol-2-ylidene][1,3-divinyl-1,1,3,3-tetramethyldisilozane]platinum(0), [1,3-bis(2,6-diisopropylphenyl)imidazolidinylidene][1,3-divinyl-1,1,3,3-tetramethyldisilozane]platinum(0), and [1,3-bis(cyclohexyl)imidazol-2-ylidene][1,3-divinyl-1,1,3,3-tetramethyldisilozane]platinum(0).

In some embodiments, such resin-containing top coating solutions are applied using coating techniques known to those skilled in the art including, for example, wire wound rods, notched bars, gap coaters, and knife coaters.

In some embodiments, the barrier layer is a barrier film. In some embodiments, the barrier film includes a thermoplastic polymer. In some embodiments, the thermoplastic polymer may be a polyolefin, a polyester, a polyamide, a polyimide, a polycarbonate, a polyvinyl chloride (including a plasticized polyvinyl chloride), a polyurethane, a poly (methyl methacrylate), or a combination thereof.

In some embodiments, wherein the barrier layer is a barrier film, an adhesive may be disposed between the barrier film and the structural component. Those skilled in the art will be able to select suitable adhesives, for example and without limitation, hot melt adhesives, heat activated adhesives, or pressure sensitive adhesives, as described herein below, dependent in large part upon the desired application of the photochromic article.

In some embodiments, whether in the form of a coating (i.e., top coat) or a barrier film, the barrier layer has a thickness of at least 1 micrometer (μm), at least 2 μm, at least 5 μm, or at least 20 μm. In some embodiments, whether in the form of a coating or a barrier film, the barrier layer has a thickness of up to 250 μm, up to 125 μm, up to 100 μm, up to 80 μm, up to 60 μm, up to 40 μm, or up to 25 μm.

Photochromic Articles

Figure 2:
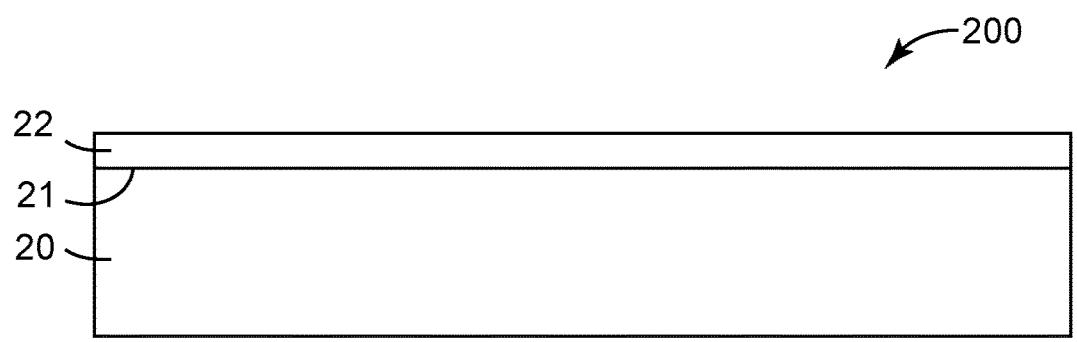
FIG. 2 is a schematic cross-sectional view of another exemplary photochromic article according to the disclosure.

Referring to FIG. 2, a schematic cross-sectional view of a photochromic article is provided. The photochromic article 200 contains a structural component 20, a fluid (not shown) in contact with the structural component 20, and a photochromic organic dye (not shown) in contact with the fluid. The photochromic article 200 further includes a layer 22 disposed on a first major surface 21 of the structural component 20. The layer 22 is a barrier layer that reduces mobility of the fluid and dye out of and/or away from the structural component.

Figure 3:
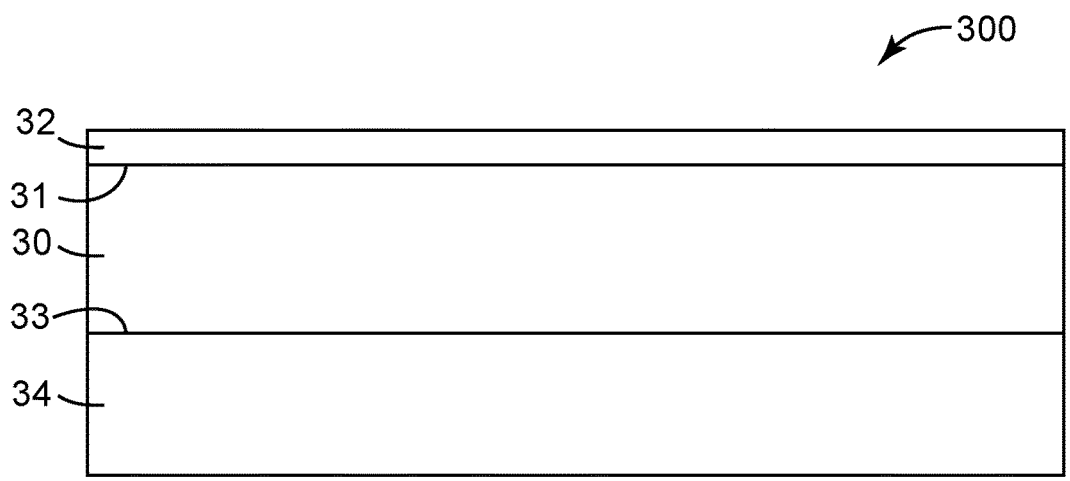
FIG. 3 is a schematic cross-sectional view of a further exemplary photochromic article according to the disclosure.

Referring to FIG. 3, a schematic cross-sectional view of a photochromic article is provided. The photochromic article 300 contains a structural component 30, a fluid (not shown) in contact with the structural component 30, and a photochromic organic dye (not shown) in contact with the fluid. The photochromic article 300 further includes a layer 32 disposed on a first major surface 31 of the structural component 30 and a transparent substrate (i.e., transparent support substrate) 34 disposed on a second major surface 33 of the structural component 30. The layer 32 is a barrier layer, generally as described above with respect to FIG. 2.

While in certain embodiments the structural component provides sufficient mechanical integrity for the photochromic article, in some embodiments a transparent support substrate is employed in the photochromic article. For any embodiment in which it is used, a transparent support substrate typically includes a glass, polycarbonate, polyethylene terephthalate (PET), poly(methyl methacrylate) (PMMA), or a combination thereof.

A support substrate is typically a material with sufficient structural integrity for the structural component to be formed thereon. While a support substrate could function as a barrier layer in a final photochromic article, a barrier layer is typically formed on or applied to the structural component after the fluid is placed in contact with (e.g., infused into) the structural component. Even if the support substrate functions as a barrier layer, an additional barrier layer is required on the opposing surface of the structural component. A barrier layer would typically not have the structural integrity of a support substrate.

Figure 4:
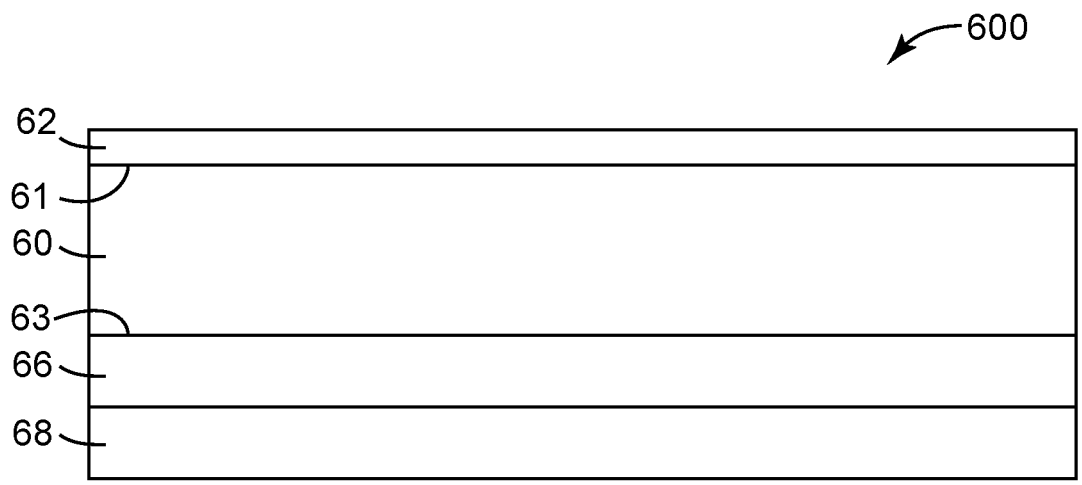
FIG. 4 is a schematic cross-sectional view of an additional exemplary photochromic article according to the disclosure.

Referring now to FIG. 4, a schematic cross-sectional view of a photochromic article is provided. The photochromic article 600 contains a structural component 60, a fluid (not shown) in contact with the structural component 60, and a photochromic organic dye (not shown) in contact with the fluid. The photochromic article 600 further includes a layer 62 disposed on a first major surface 61 of the structural component 60, an adhesive 66 disposed on a second major surface 63 of the structural component 60, and a liner 68 disposed on the adhesive 66 opposite the structural component 60. The layer 62 is a barrier layer, generally as described above with respect to FIG. 2.

For adhesive layer 66, those skilled in the art will be able to select suitable adhesives, for example and without limitation, hot melt adhesives, heat activated adhesives, or pressure sensitive adhesives, as described herein, dependent in large part upon the desired application of the photochromic article.

Illustrative suitable tackified rubber hot melt adhesives are disclosed in U.S. Pat. No. 4,125,665 (Bemmels et al.) and U.S. Pat. No. 4,152,231 (St. Clair et al.). Illustrative suitable acrylic hot melt adhesives are disclosed in U.S. Pat. No. 4,656,213 (Schlademan) and U.S. Pat. No. 5,804,610 (Hamer et al.). Further illustrative adhesives that may be applied as hot melt adhesives suitable for use with photochromic articles of the disclosure are disclosed in U.S. Pat. No. 8,492,486 (Sherman), U.S. Pat. No. 8,202,934 (Sherman), and U.S. Pat. No. 7,084,209 (Everaerts).

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky. Examples of suitable heat activated adhesives include polyacrylate hot melt adhesives, polyvinyl butyrals, ethylene vinyl acetate, ionomers, polyolefins, or combinations thereof.

Pressure sensitive adhesive (PSA) compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power. Obtaining the proper balance of properties is not a simple process. Pressure sensitive adhesives useful in the present invention include tackified natural rubbers, synthetic rubbers, tackified styrene block copolymers, polyvinyl ethers, acrylics, poly-alpha-olefins, and silicones. Illustrative pressure sensitive adhesives that are suitable for use in the invention are described in U.S. Pat. Appl. Pub. Nos. 2013/0337260 (Tapio et al.), 2013/0316076 (Sherman), 2012/0295025 (Sherman et al.), 2012/0100326 (Sherman et al.), and 2009/0161058 (Sherman).

Still referring to FIG. 4, to protect the adhesive prior to use in adhering the transparent photochromic article 600 to an object or structure, in certain embodiments a liner 68 is disposed on the adhesive 66 opposite the structural component 60. Stated another way, the adhesive 66 is disposed between the structural component 60 and the liner 68. The release liner is formed from, or coated with, a material that releases cleanly from the adhesive when peeled off by the end user, in embodiments transferring substantially no residue of the release liner material on or in the adhesive. Such release liners are well known by those of skill in the art and any of the conventionally employed release liners are suitably applied to the adhesive, for example, silicone-coated paper.

Figure 5:
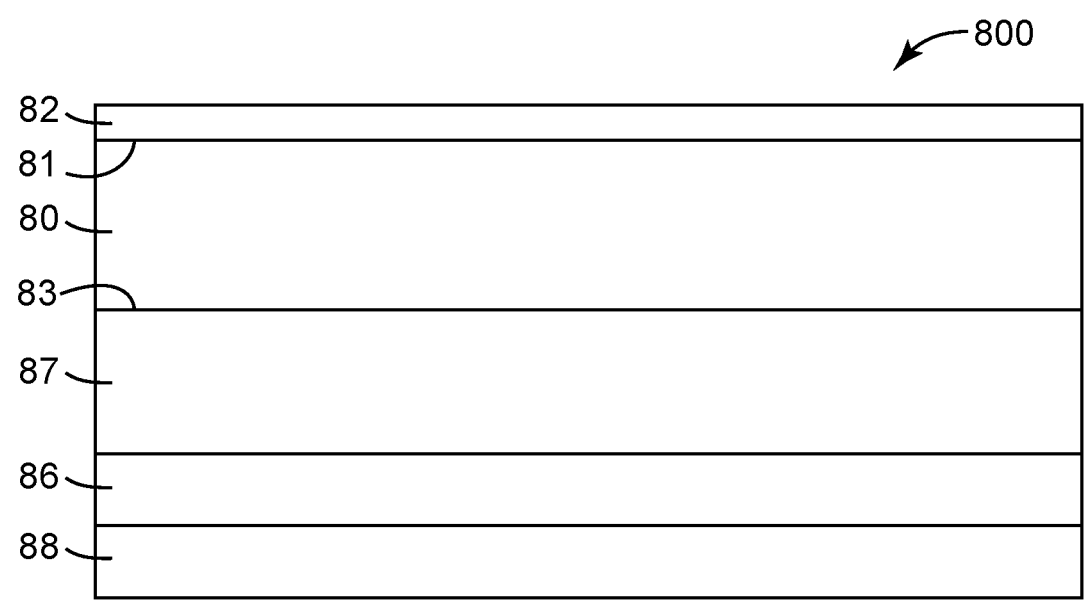
FIG. 5 is a schematic cross-sectional view of another exemplary photochromic article according to the disclosure.

Referring to FIG. 5, a schematic cross-sectional view of a photochromic article is provided. The photochromic article 800 contains a structural component 80, a fluid (not shown) in contact with the structural component 80, and a photochromic organic dye (not shown) in contact with the fluid. The photochromic article 800 also includes a layer 82 disposed on a first major surface 81 of the structural component 80. The transparent photochromic article 800 further includes a transparent substrate (i.e., transparent support substrate) 87 disposed on a second major surface 83 of the structural component 80. In addition, the photochromic article 800 includes an adhesive 86 disposed on the transparent support substrate 87 opposite the structural component 80, and a liner 88 disposed on the adhesive 86 opposite the transparent support substrate 87. The layer 82 is a barrier layer, generally as described above with respect to FIG. 2.

Figure 6:
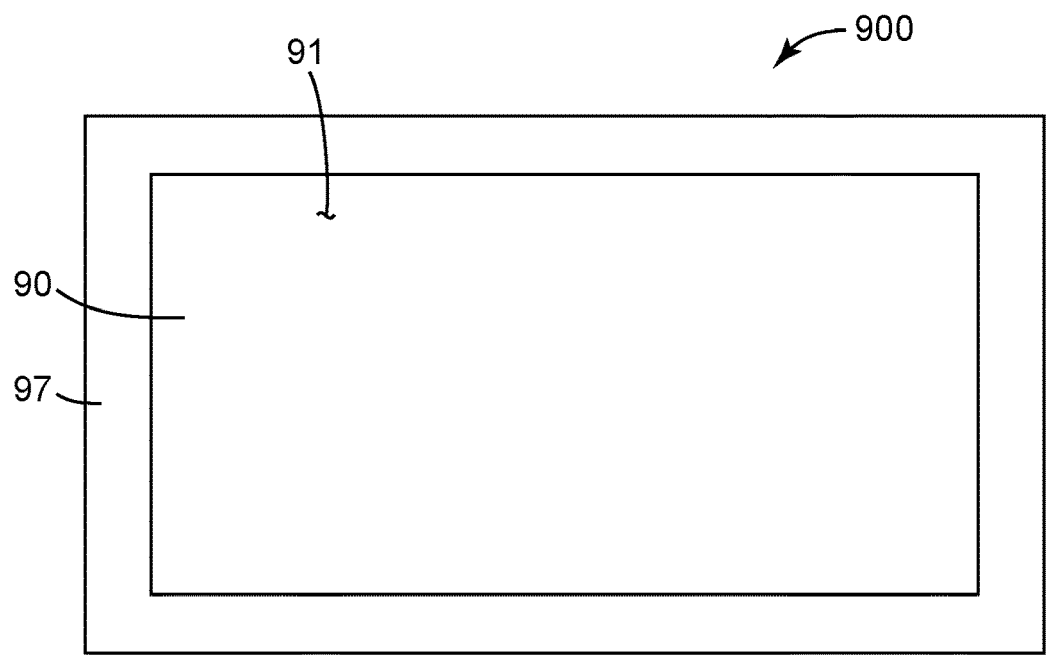
FIG. 6 is a schematic top view of a further exemplary photochromic article according to the disclosure.

As an alternative to (or in addition to) employing a support substrate such as a polymer film layer and/or a transparent substrate like glass, the transparent article optionally includes a frame around at least a portion of the perimeter of the structural component of the photochromic article. Referring to FIG. 6, a schematic top view of a photochromic article is provided. The photochromic article 900 contains a structural component 90, a fluid (not shown) in contact with the structural component 90, and a photochromic organic dye (not shown) in contact with the fluid. The photochromic article 900 also includes a frame 97 attached to a major surface 91 of the structural component 90, and a barrier layer (not shown) disposed on major surface 91 and/or the major surface of the structural component opposite major surface 91. A frame can provide mechanical integrity to the photochromic article without requiring completely covering a major surface of the structural component. Further, the frame can be the point of attachment of the photochromic article to an object or structure (e.g., building window, etc.).

Figure 7:
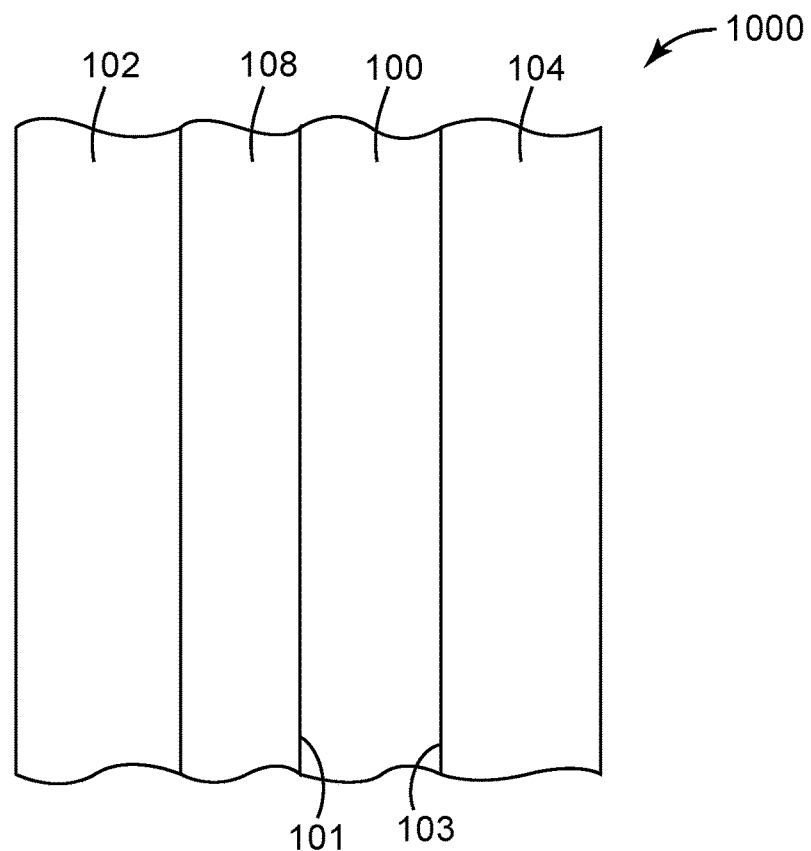
FIG. 7 is a schematic cross-sectional view of a still further exemplary photochromic article according to the disclosure.

Referring to FIG. 7, a schematic cross-sectional view of a photochromic article (e.g., a double pane window) is provided. The photochromic article 1000 contains a structural component 100, a fluid (not shown) in contact with the structural component 100, a photochromic organic dye (not shown) in contact with the fluid, and a barrier layer (not shown) disposed on a second major surface of the structural component 100. The photochromic article 1000 further includes a first transparent substrate 104 disposed on a first major surface 103 of the structural component 100, and a second transparent substrate 102 disposed opposing the first transparent substrate 104. In the illustrated embodiment, a gaseous atmosphere or vacuum 108 is disposed between the second transparent substrate 102 and adjacent to a second major surface 101. Examples of transparent substrates include glass, polycarbonate, polyethylene terephthalate (PET), poly(methyl methacrylate) (PMMA), or a combination thereof.

Figure 8:
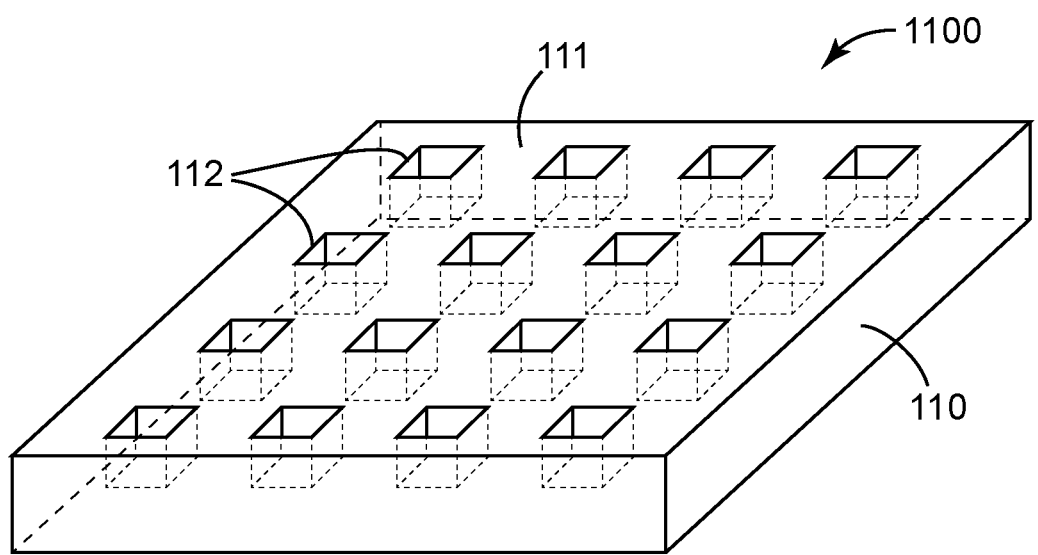
FIG. 8 is a schematic perspective view of an exemplary structural component according to the disclosure.

Referring to FIG. 8, a schematic perspective view of a photochromic article is provided. The photochromic article 1100 contains a structural component 110 that includes a plurality of cavities 112 formed in a first major surface 111 of the structural component. The cavities are illustrated to be cubic wells, but could certainly be any conceivable shape. In certain embodiments, when the structural component includes a plurality of interior cavities, the fluid at least partially fills at least a portion of the interior cavities.

Figure 9:
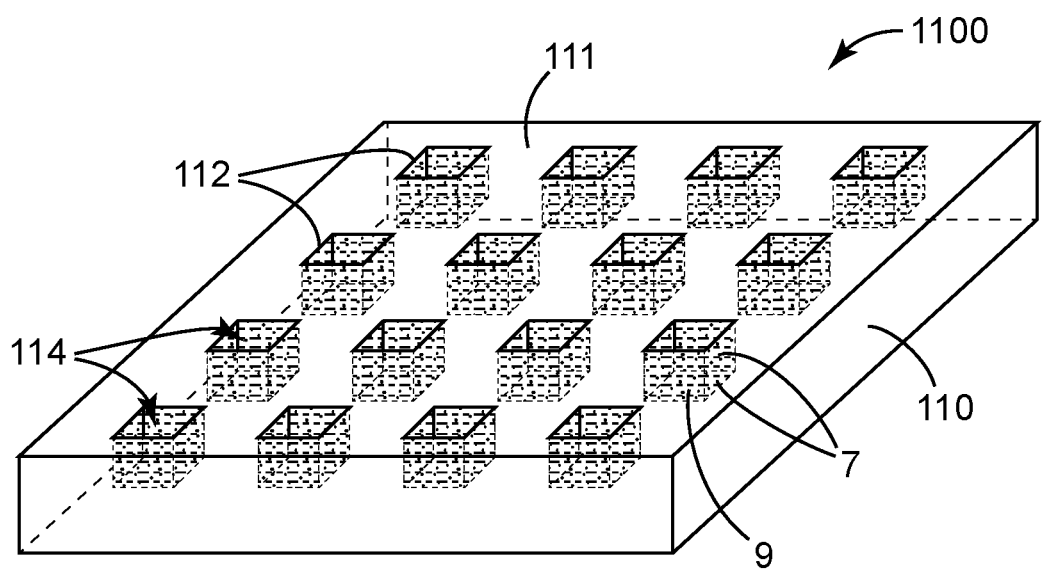
FIG. 9 is a schematic perspective view of an exemplary photochromic article including the structural component of FIG. 8 according to the disclosure.

Turning now to FIG. 9, a schematic perspective view of the transparent photochromic article of FIG. 8 is provided, further including a fluid 9 in contact with the structural component 110, and a photochromic organic dye 7 in contact with the fluid. The fluid 9 at least partially fills at least a portion of the interior cavities 112.

Figure 10:
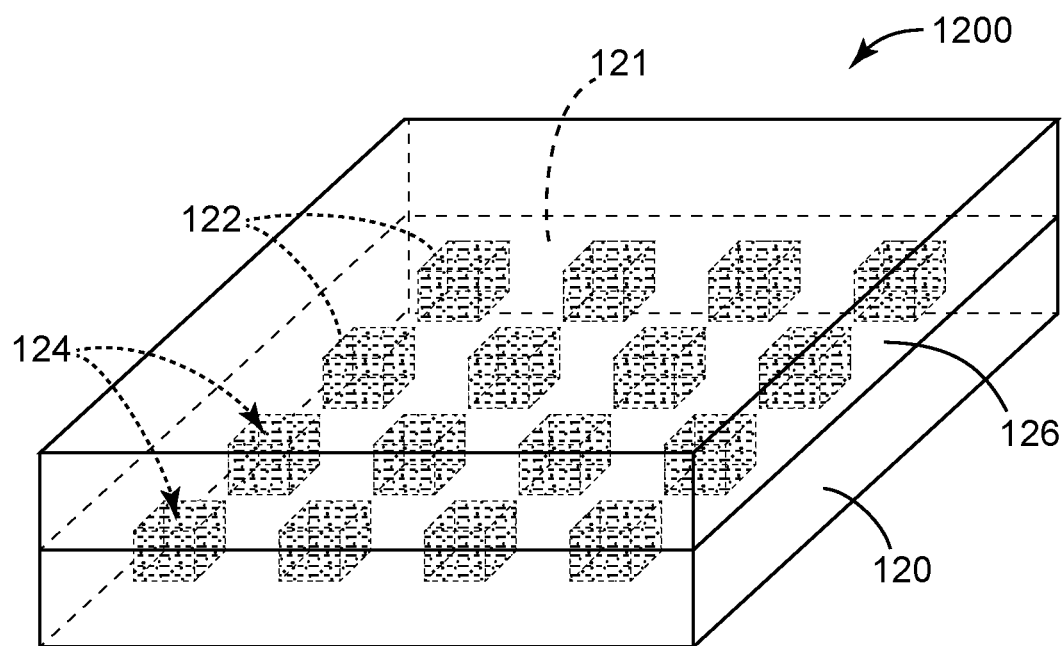
FIG. 10 is a schematic perspective view of another exemplary photochromic article according to the disclosure.

Referring to FIG. 10, a schematic perspective view of a photochromic article is provided. The photochromic article 1200 contains a structural component 120 that includes a plurality of cavities 122 formed in a first major surface 121 of the structural component 120. The photochromic article 1200 further includes a barrier layer 126 disposed on the first major surface 121 of the structural component 120.

Figure 11:
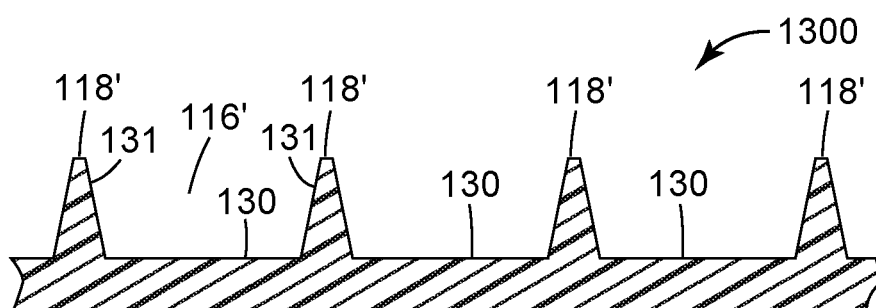
FIG. 11 is a schematic cross-sectional view of an exemplary structural component according to the disclosure.

In certain embodiments, when the structural component includes a plurality of cavities, at least one of the cavities is a channel (i.e., an elongated cavity), and the fluid at least partially fills the channel Referring to FIG. 11, a schematic cross-sectional view of a structural component 1300 including channels 116' that have a wide flat valley between slightly flattened peaks 118'. In this embodiment, bottom surfaces 130 extend between channel sidewalls 131. Other suitable channel and wall configurations for structural components having at least one channel will be apparent to one of skill in the art. In embodiments comprising at least one channel, a suitable structural component includes a sheet or film having microstructured surfaces including a plurality of open channels having a high aspect ratio (that is, channel length divided by the wetted channel perimeter). The channels are precisely replicated, with high fidelity, from a predetermined pattern and typically form a series of individual open capillary channels that extend along a major surface. Microreplicated channels formed in sheets, films, or tubes are preferably uniform and regular along substantially each channel length and more preferably from channel to channel. Suitable films having microstructured channels are described, for instance, in U.S. Pat. No. 5,514,120 (Johnston et al.) and U.S. Pat. No. 5,728,446 (Johnston et al.).

In certain embodiments, a transparent photochromic article exhibits a difference in transmission of at least 2%, or at least 3%, or at least 5%, or at least 7%, or at least 10%, after exposure to light wavelengths of 300 nm to 400 nm for a time of at least 2 minutes.

In certain embodiments, a transparent photochromic article, when in an inactivated state, includes a light transmission, over an entire wavelength range of 390 nm to 700 nm, of at least 2%, at least 3%, or at least 5%. In certain embodiments, a transparent photochromic article, when in an inactivated state, includes a light transmission, over an entire wavelength range of 390 nm to 700 nm, of up to 95%, up to 90%, up to 85%, up to 80%, up to 75%, or up to 70%. In this context, "inactivated state" means the colorless state or low absorbance in the visible region of the electromagnetic spectrum (i.e., 390 nm to 700 nm).

In certain embodiments, a transparent photochromic article includes a haze, according to the Optical Measurement Procedure in the Examples Section, of up to 30%, up to 25%, up to 20%, up to 15%, up to 10%, or up to 5%. Selecting fluids and structural components that have similar refractive indices (e.g., less than 0.1 difference in refractive indices) assists in providing a photochromic article with lower haze, than when the fluids and structural component have less similar refractive indices (e.g., at least 0.1 difference in refractive indices).

In certain embodiments, a photochromic article includes an activation speed (time taken to reach 80% of final activated strength) of no more than 3 minutes, no more than 2 minutes, no more than 1 minute, or no more than 30 seconds.

In certain embodiments, a photochromic article includes a half-life (time taken to attain half of the change in transmission of the activated state from the inactivated state) of no more than 3 minutes, or no more than 90 seconds.

In certain embodiments, a photochromic article has an initial rate of coloring, according to the Photochromic Dye Kinetic Measurement Procedure in the Examples Section, of at least 0.2 $\sec^{-1}$ (change in transmission per unit time). In certain embodiments, a photochromic article has an initial rate of fading, according to the Photochromic Dye Kinetic Measurement Procedure in the Examples Section, of at least 0.5 $\sec^{-1}$ (change in transmission per unit time).

In certain embodiments, a photochromic article is flexible.

In certain embodiments, a photochromic article is selected from a window, a film, a corrective lens, a display cover layer, a window glazing, a decal, a sticker, a tattoo, a card, a label, an information display, a banner, or a combination thereof.

In certain embodiments, a photochromic article may include a patterned photochromic layer. The pattern may include, for example, polygonal or non-polygonal shapes or other indicia such as a graphic selected from a logo, a trademark, a picture, at least one alphanumeric character, an insignia, or a plurality of indicia.

Methods

In one aspect, the present disclosure provides a method of forming a photochromic article. The method includes: distributing a photochromic organic dye in a fluid; placing the fluid in contact with a structural component, wherein the structural component includes a polymeric material that is porous, includes a plurality of cavities, or a combination thereof; and placing a barrier layer on the structural component to provide a barrier for the fluid and photochromic organic dye; wherein the article is photochromic.

In some embodiments of the method of forming a photochromic article, placing a barrier layer on (a major surface of) the structural component includes laminating a barrier film to the structural component. Alternatively, a barrier film can be adhered to the structural component using an intervening layer of an adhesive.

In some embodiments of the method of forming a photochromic article, placing a barrier layer on (a major surface of) the structural component includes coating a resin-containing coating solution on the structural component to form a coating (i.e., top coat), removing the solvent, and exposing the resultant reaction mixture to ultraviolet (UV) radiation or thermal energy.

In some embodiments, the resin-containing top coating solution includes one or more solvents, such as toluene, xylene, butyl acetate, ethyl acetate, acetone, methyl ethyl ketone, methyl isobutyl ketone, ethanol, isopropanol, and 1-methoxy-2-propanol, and combinations thereof.

In some embodiments, the resin-containing top coating solution has a solids content of at least 10 wt-%, at least 50 wt-%, or at least at least 70 wt-%.

In some embodiments, the resin-containing top coating solution has a surface tension less than that of the fluid-containing structural component. Exemplary fluids used in combination with a structural component have surface tensions as follows: PEG has a surface tension of 45 dynes/cm; PDMS has a surface tension of 20 dynes/cm; and dibutyl sebacate has a surface tension of 32 dynes/cm. Exemplary solvents used in top coating solutions have surface tensions as follows: xylene has a surface tension of 28.9 dynes/cm; toluene has a surface tension of 28.5 dynes/cm; and methyl ethyl ketone has a surface tension of 24 dynes/cm.

In some embodiments, the structural component includes a porous polymeric material and placing the fluid in contact with the structural component includes infusing (e.g., imbibing) the fluid into the porous polymeric material. In some embodiments, the structural component includes a polymeric material that includes a plurality of cavities, wherein at least one of the cavities is a channel, and placing the fluid in contact with the structural component includes at least partially filling the channel. In some embodiments, the structural component includes a polymeric material that includes a plurality of interior cavities, and placing the fluid in contact with the structural component includes at least partially filling at least a portion of the interior cavities with the fluid.

In some embodiments, the methods of preparing the photochromic articles further include disposing a transparent support substrate (as disclosed herein) on the structural component.

In any of the embodiments, the method optionally further includes disposing a barrier layer on one or both major surfaces of the structural component, attaching a transparent support substrate to a major surface of the structural component, applying a layer to a major surface of the structural component, attaching an adhesive to a major surface of the structural component, attaching a transparent support substrate to a major surface of the structural component, attaching a frame to a major surface of the structural component, or any combination thereof. By "attaching to a major surface of the structural component," it is to be understood that in certain embodiments there is optionally one or more layers of other materials between the attached material and the structural component rather than necessarily being directly attached (or coated, etc.).

In another aspect of the present disclosure, a method of changing the light transmission of a photochromic article is provided. The method includes providing a photochromic article and exposing the photochromic article to light wavelengths of 300 nm to 400 nm for a time of at least 2 minutes such that the article exhibits a difference in transmission of at least 2%, at least 3%, at least 5%, at least 7%, or at least 10%. The photochromic article contains a structural component, a fluid in contact with the structural component, a photochromic organic dye in contact with the fluid, and a barrier layer disposed on the structural component to provide a barrier for the fluid and photochromic organic dye. The structural component includes a polymeric material that is porous, includes a plurality of cavities, or a combination thereof. The article is photochromic. The method of changing a light transmission is particularly useful for applications in which light wavelengths will travel from one major surface of the photochromic article through the opposing major surface of the photochromic article.

In some embodiments, the time of exposing is at least 4 minutes, at least 5 minutes, at least 6 minutes, at least 8 minutes, at least 10 minutes, at least 12 minutes, at least 15 minutes, at least 20 minutes, at least 30 minutes, at least 45 minutes, or at least 60 minutes. Typically, the method further includes ceasing the exposing to the light wavelengths for at least 4 minutes such that the article exhibits a difference in transmission of at least 2%, at least 3%, or at least 5%, compared to the activated transmission.

In some embodiments, the time of ceasing the exposing to the light wavelengths is optionally at least 5 minutes, at least 8 minutes, at least 10 minutes, at least 15 minutes, at least 20 minutes, at least 30 minutes, at least 45 minutes, at least 60 minutes, or at least 90 minutes. Moreover, in some embodiments the method further includes cycling between the exposing the photochromic article to the light wavelengths and the ceasing exposing the photochromic article to the light wavelengths, wherein the cycling includes at least two cycles of each of the exposing the photochromic article to the light wavelengths and the ceasing the exposing the photochromic article to the light wavelengths and alternating between the exposing and the ceasing the exposing. Advantageously, the photochromic article often exhibits the difference in transmission following each cycle for at least 20 cycles, at least 50 cycles, at least 100 cycles, at least 250 cycles, at least 500 cycles, or at least 1,000 cycles. Although the difference in transmission may decline gradually over time during cycling, it remains at least a specific percentage for a minimum number of cycles.

EXEMPLARY EMBODIMENTS

Embodiment 1 is a photochromic article comprising: a structural component comprising a polymeric material that is porous, includes a plurality of cavities, or a combination thereof; a fluid in contact with the structural component; a photochromic organic dye in contact with the fluid; and a barrier layer disposed on the structural component to provide a barrier for the fluid and photochromic organic dye therein; wherein the article is photochromic.

Embodiment 2 is the photochromic article of embodiment 1, wherein the photochromic article is transparent over an entire wavelength range of 390 nm to 700 nm.

Embodiment 3 is the photochromic article of embodiment 1 or 2, wherein at least a portion of the photochromic organic dye is dissolved in the fluid.

Embodiment 4 is the photochromic article of embodiment 1 or 2, wherein at least a portion of the photochromic organic dye is dispersed in the fluid.

Embodiment 5 is the photochromic article of any of embodiments 1 to 4, wherein the structural component has two major surfaces and a barrier layer is disposed on each of the major surfaces of the structural component.

Embodiment 6 is the photochromic article of any of embodiments 1 to 5, wherein the porous polymeric material comprises a microporous film, a mesoporous film, a macroporous film, or a combination thereof.

Embodiment 7 is the photochromic article of any of embodiments 1 to 6, wherein the porous polymeric material comprises an aliphatic polyurethane, an acrylic, a polyester, a polyimide, a polyamide, an epoxy polymer, a polystyrene, a silicone-containing polymer, a fluorinated polymer, or a combination thereof.

Embodiment 8 is the photochromic article of any of embodiments 1 to 7, wherein the structural component comprises a plurality of cavities, wherein at least one of the cavities is a channel, and wherein the fluid at least partially fills the channel.

Embodiment 9 is the photochromic article of embodiment 8, wherein the structural component comprises a plurality of interior cavities, wherein the fluid at least partially fills at least a portion of the interior cavities.

Embodiment 10 is the photochromic article of embodiment 8 or 9, wherein the structural component comprises an embossed polymer, a molded polymer, or a combination thereof.

Embodiment 11 is the photochromic article of any of embodiments 1 to 10, further comprising a transparent support substrate disposed on a major surface of the structural component opposite the barrier layer.

Embodiment 12 is the photochromic article of embodiment 11, wherein the transparent support substrate comprises a glass, polycarbonate, PET, PMMA, or a combination thereof.

Embodiment 13 is the photochromic article embodiment 11 or 12, further comprising a layer of an adhesive disposed on the transparent support substrate opposite the structural component.

Embodiment 14 is the photochromic article of any of embodiments 1 to 13, wherein the fluid comprises a compound having a solubility parameter of 7 $(cal/cm^3)^{1/2}$ to 12.5 $(cal/cm^3)^{1/2}$ and/or is aprotic.

Embodiment 15 is the photochromic article of embodiment 14, wherein the fluid comprises a polyalkylene oxide, a polysiloxane, a solvent having a boiling point of 200° C. or higher at atmospheric pressure, or a combination thereof.

Embodiment 16 is the photochromic article of embodiment 15, wherein the fluid comprises a polyalkylene oxide, a polysiloxane, or a combination thereof (e.g., mixture or copolymer thereof).

Embodiment 17 is the photochromic article of embodiment 16, wherein the fluid comprises a polyalkylene oxide.

Embodiment 18 is the photochromic article of embodiment 17, wherein the polyalkylene oxide comprises polyethylene glycol having a molecular weight less than or equal to 600 grams per mole.

Embodiment 19 is the photochromic article of embodiment 16, wherein the fluid comprises a dimethylsiloxane-ethylene oxide copolymer.

Embodiment 20 is the photochromic article of embodiment 15, wherein the fluid comprises a solvent having a boiling point of 200° C. or higher at atmospheric pressure.

Embodiment 21 is the photochromic article of embodiment 20, wherein the solvent having a boiling point of 200° C. or higher at atmospheric pressure is selected from di(2-ethylhexyl) adipate, tributyl phosphate, dibutyl sebacate, and a combination thereof.

Embodiment 22 is the photochromic article of any of embodiments 1 to 21, wherein the photochromic organic dye is selected from a spiropyran, spirooxazine, a naphthopyran, and a combination thereof.

Embodiment 23 is the photochromic article of embodiment 22, wherein the photochromic organic dye is a spiropyran or spirooxazine of Formula (I):

wherein:
  X is NH, O, or S;
  Y is N or CH;
  each of $R^1$, $R^2$, and $R^3$ independently represents:
  hydrogen, a (C1-C6)alkyl, or a (C3-C6)cycloalkyl;
  each of $R^4$ through $R^{11}$ independently represents:
  hydrogen, an aliphatic group, an alicyclic group, an aryl group (e.g., phenyl), an alkaryl group, an aralkyl group, a silyl group, an (—$NO_2$) group, a (—CN) group, a halo group, an (—$NH_2$) group, an amine group, an (—OH) group, a heteroalkyl group, a heteroaryl group, a heterocyclic group, an aliphatic oxy group, an alicyclic oxy group, an aryloxy group, an arylthio group, a (—C(O)H) group, an (—C(O)OH) group, an (—$SO_3R'$) group, wherein R' is H or a monovalent cation (e.g., alkali metal cation), an $R^4$—C(O)— group, an $R^4$—C(O)—O— group, an $R^4$—O—C(O)— group, an $R^4$—C(O)—NH— group, and an $R^4$—N(H)—C(O)— group, wherein $R^4$ is an aryl group, a (C1-C10)aliphatic group, or a (C3-C10)alicyclic group;
  wherein the aliphatic group, alicyclic group, aryl group, alkaryl group, aralkyl group, amine group, and $R^4$ groups may be substituted with any of the groups defined for the $R^4$ through $R^{11}$ groups; and
  wherein adjacent $R^4$ through $R^{11}$ groups, or any adjacent positions within the $R^4$ through $R^{11}$ alicyclic or heterocyclic groups, may be joined to create a fused ring (e.g., a six-membered aromatic ring) wherein the ring may be substituted with any of the groups defined for the $R^4$ through $R^{11}$ groups. (For example, if $R^6$ is a five-member nitrogen heterocycle with two substituents, the two substituents may be joined to form a fused ring to the five-member nitrogen heterocycle.)

Embodiment 24 is the photochromic article of embodiment 23, wherein the spiropyran or spirooxazine of Formula (I) is selected from:

CAS #114747-48-7

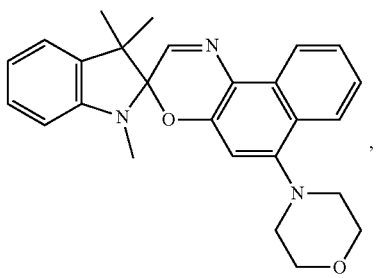

,

CAS #114747-45-4

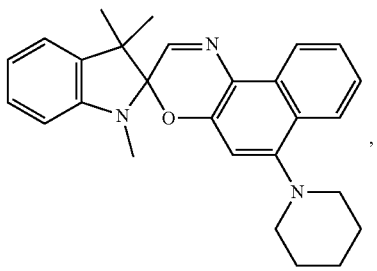

,

CAS #124956-65-6

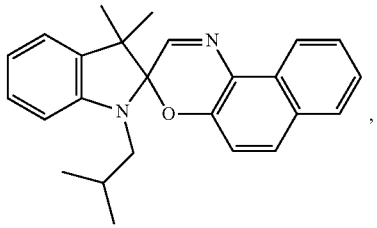

,

CAS #276670-70-3

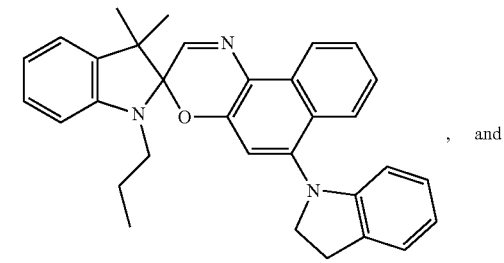

, and

CAS #1715932-70-9

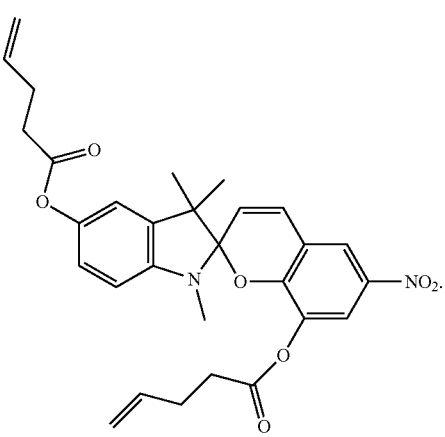

.

Embodiment 25 is the photochromic article of embodiment 24, wherein the spirooxazine of Formula (I) is 6'-(2,3-dihydro-1H-indole-1-yl)-1,3-dihydro-3,3-dimethyl-1-propyl-spiro(2H-indole-2,3'-[3H]-naphtho-(2,1-b)-(1,4)-oxazine (CAS #276670-70-3) or 1'-isobutyl-3',3'-dimethyl-spiro[benzo[f][1,4]benzoxazine-3,2'-indoline] (CAS #124956-65-6).

Embodiment 26 is the photochromic article of embodiment 22, wherein the photochromic organic dye is a naphthopyran of Formula (II):

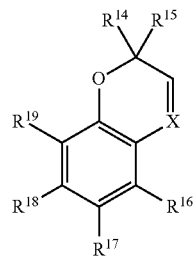

wherein:

X is N or CH;

each of $R^{14}$ through $R^{19}$ independently represents:

hydrogen, an aliphatic group, an alicyclic group, an aryl group (e.g., phenyl), an alkaryl group, an aralkyl group, a silyl group, an (—$NO_2$) group, a (—CN) group, a halo group, an (—$NH_2$) group, an amine group, an (—OH) group, a heteroalkyl group, a heteroaryl group, a heterocyclic group, an aliphatic oxy group, an alicyclic oxy group, an aryloxy group, an arylthio group, a (—C(O)H) group, a (—C(O)OH) group, an (—$SO_3R'$) group, wherein R' is H or a monovalent cation (e.g., alkali metal cation), an $R^A$—C(O)— group, an $R^A$—C(O)—O— group, an $R^A$—O—C(O)— group, an $R^A$—C(O)—NH— group, and an $R^A$—N(H)—C(O)— group, wherein $R^A$ is an aryl group, a (C1-C10)aliphatic group, or a (C3-C10)alicyclic group;

wherein the aliphatic group, alicyclic group, aryl group, alkaryl group, aralkyl group, amine group, and $R^A$ groups may be substituted with any of the groups defined for the $R^{14}$ through $R^{19}$ groups; and wherein adjacent $R^{16}$ through $R^{19}$ groups, or any adjacent positions within the $R^{14}$ through $R^{19}$ alicyclic or heterocyclic groups, may be joined to create a fused ring (e.g., a six-membered aromatic ring) wherein the ring may be substituted with any of the groups defined for the $R^{14}$ through $R^{19}$ groups.

Embodiment 27 is the photochromic article of embodiment 26, wherein the naphthopyran of Formula (II) is selected from:

CAS #4222-20-2

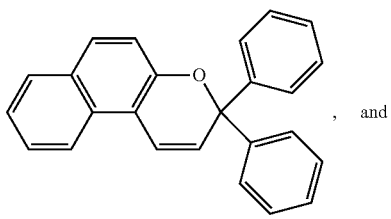

, and

CAS #263026-66-0

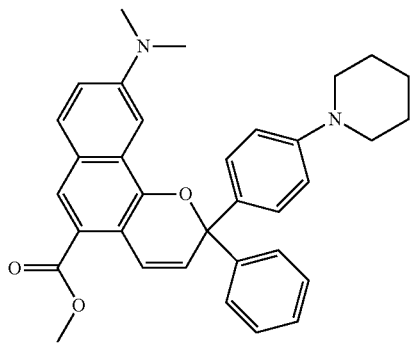

Embodiment 28 is the photochromic article of embodiment 27, wherein the naphthopyran of Formula (II) is methyl 9-(dimethylamino)-2-phenyl-2-[4-(1-piperidyl)phenyl] benzo[h]chromene-5-carboxylate (CAS #263026-66-0).

Embodiment 29 is the photochromic article of any of embodiments 1 to 28, wherein the photochromic organic dye is present in the fluid in an amount of at least 0.05 wt-%.

Embodiment 30 is the photochromic article of any of embodiments 1 to 29, wherein the photochromic organic dye is present in the fluid in an amount of up to 20 wt-%.

Embodiment 31 is the photochromic article of any of embodiments 1 to 30, wherein the barrier layer is a coating.

Embodiment 32 is the photochromic article of embodiment 31, wherein the coating comprises a UV-cured system.

Embodiment 33 is the photochromic article of embodiment 32, wherein the coating comprises a polymerized multifunctional (meth)acrylate.

Embodiment 34 is the photochromic article of embodiment 32, wherein the coating comprises a polymerized urethane (meth)acrylate.

Embodiment 35 is the photochromic article of embodiment 31, wherein the coating comprises a thermally cured system.

Embodiment 36 is the photochromic article of embodiment 35, wherein the coating is a hydrosilylation-cured polysiloxane.

Embodiment 37 is the photochromic article of any of embodiments 1 to 30, wherein the barrier layer is a barrier film.

Embodiment 38 is the photochromic article of embodiment 37, wherein the film comprises a thermoplastic polymer.

Embodiment 39 is the photochromic article of embodiment 38, wherein the thermoplastic polymer comprises a polyolefin, a polyester, a polyamide, a polyimide, a polycarbonate, a polyvinyl chloride (including a plasticized polyvinyl chloride), a polyurethane, a poly(methyl methacrylate), or a combination thereof.

Embodiment 40 is the photochromic article of any of embodiments 37 to 39, further comprising an adhesive disposed between the barrier film and the structural component.

Embodiment 41 is the photochromic article of any of embodiments 1 to 40, wherein the barrier layer has a thickness of at least 1 μm.

Embodiment 42 is the photochromic article of any of embodiments 1 to 41, wherein the barrier layer has a thickness of up to 250 μm.

Embodiment 43 is the photochromic article of any of embodiments 1 to 37, wherein the article exhibits a difference in transmission of at least 2%, at least 3%, at least 5%, at least 7%, or at least 10%, after exposure to light wavelengths of 300 nm to 400 nm for a time of at least 2 minutes.

Embodiment 44 is the photochromic article of any of embodiments 1 to 43, wherein the photochromic article, when in an inactivated state, comprises a light transmission, over an entire wavelength range of 390 nm to 700 nm, of at least 2%, at least 3%, or at least 5%.

Embodiment 45 is the photochromic article of any of embodiments 1 to 44, wherein the photochromic article, when in an inactivated state, comprises a light transmission, over an entire wavelength range of 390 nm to 700 nm, of up to 95%, up to 90%, up to 85%, up to 80%, up to 75%, or up to 70%.

Embodiment 46 is the photochromic article of any of embodiments 1 to 45, wherein the photochromic article comprises a haze, according to the Optical Measurement Procedure, of up to 30%, up to 25%, up to 20%, up to 15%, up to 10%, or up to 5%.

Embodiment 47 is the photochromic article of any of embodiments 1 to 46, wherein the photochromic article comprises an activation speed (time taken to reach 80% of final activated strength) of no more than 3 minutes, no more than 2 minutes, no more than 1 minute, or no more than 30 seconds.

Embodiment 48 is the photochromic article of any of embodiments 1 to 47, wherein the photochromic article has a half-life of no more than 3 minutes, or no more than 90 seconds.

Embodiment 49 is the photochromic article of any of embodiments 1 to 48, wherein the photochromic article has an initial rate of coloring, according to the Photochromic Dye Kinetic Measurement Procedure, of at least 0.2 sec$^{1}$.

Embodiment 50 is the photochromic article of any of embodiments 1 to 49, wherein the photochromic article has an initial rate of fading, according to the Photochromic Dye Kinetic Measurement Procedure, of at least 0.5 sec$^{1}$.

Embodiment 51 is the photochromic article of any of embodiments 1 to 50, wherein the photochromic article is flexible.

Embodiment 52 is the photochromic article of any of embodiments 1 to 51, wherein the photochromic organic dye is patterned on the structural component in the form a graphic selected from a logo, a trademark, a picture, at least one alphanumeric character, an insignia, or a plurality of indicia.

Embodiment 53 is the photochromic article of any of embodiments 1 to 52, wherein the article is selected from a window, a film, a corrective lens, a display cover layer, a window glazing, a decal, a sticker, a tattoo, a card, a label, an information display, a banner, or a combination thereof.

Embodiment 54 is a method of forming a photochromic article comprising: distributing a photochromic organic dye in a fluid; placing the fluid in contact with a structural component, wherein the structural component comprises a polymeric material that is porous, includes a plurality of cavities, or a combination thereof and placing a barrier layer on the structural component to provide a barrier for the fluid and photochromic organic dye; wherein the article is photochromic.

Embodiment 55 is the method of embodiment 54, wherein the structural component comprises a porous polymeric material and placing the fluid in contact with the structural component comprises infusing the fluid into the porous polymeric material.

Embodiment 56 is the method of embodiment 54 or 55, further comprising disposing a transparent support substrate on the structural component.

Embodiment 57 is the method of any of embodiments 54 to 56, wherein placing a barrier layer on the structural component comprises coating a resin-containing coating solution on the structural component to form a coating.

Embodiment 58 is the method of embodiment 57, wherein the resin-containing coating solution has a surface tension less than that of the fluid-containing structural component.

Embodiment 59 is the method of embodiments 57 or 58, wherein the resin-containing coating solution has a solids content of at least 10 wt-%, at least 50 wt-%, or at least at least 70 wt-%.

Embodiment 60 is the method of any of embodiments 57 to 59, wherein the resin-containing coating solution comprises a urethane (meth)acrylate.

Embodiment 61 is the method of embodiment 60, wherein the urethane (meth)acrylate is prepared from one or more hydroxyalkyl (meth)acrylates (i.e., acrylates or methacrylates), optionally one or more other hydroxyl-containing compounds, and one or more multifunctional isocyanates.

Embodiment 62 is the method of any of embodiments 57 to 59, wherein the resin-containing coating solution comprises a multifunctional (meth)acrylate.

Embodiment 63 is the method of embodiment 62, wherein the multifunctional (meth)acrylate is selected from pentaerythritol triacrylate, pentaerythritol tetraacrylate, 1,3-butylene glycol diacrylate, 1,4-butanediol diacrylate, 1,6-hexanediol diacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, diethylene glycol diacrylate, dipropylene glycol diacrylate, ethoxylated bisphenol A diacrylate, glycerol triacrylate, trimethylolpropane triacrylate, ethoxylated triacrylate, propoxylated triacrylates, tris(2-hydroxyethyl)isocyanurate triacrylate, ditrimethylolpropane tetraacrylate, dipentaerythritol pentaacrylate, ethoxylated pentaerythritol tetraacrylate, caprolactone modified dipentaerythritol hexaacrylate, and a combination thereof.

Embodiment 64 is the method of any of embodiments 57 to 59, wherein the resin-containing coating solution comprises a vinyl-containing polysiloxane and a hydride-containing polysiloxane.

Embodiment 65 is the method of embodiment 64, wherein:

the vinyl-containing polysiloxane is selected from vinyl-terminated polydimethylsiloxane, vinyl-terminated polyphenylmethylsiloxane, vinyl-terminated polydiphenylsiloxane, vinyl-terminated diphenylsiloxane-dimethylsiloxane copolymer, vinylmethylsiloxane-dimethylsiloxane copolymer, and a combination thereof; and the hydride-containing polysiloxane is selected from dimethylsiloxane-methylhydrosiloxane copolymer, hydride-terminated polydimethylsiloxane, polymethylhydrosiloxane, methylhydrosiloxane-phenylmethylsiloxane copolymer, and a combination thereof.

Embodiment 66 is a method of changing a light transmission of a photochromic article comprising: providing a photochromic article comprising: a structural component comprising a polymeric material that is porous, includes a plurality of cavities, or a combination thereof; a fluid in contact with the structural component; a photochromic organic dye in contact with the fluid; and a barrier layer disposed on the structural component to provide a barrier for the fluid and photochromic organic dye; and exposing the photochromic article to light wavelengths of 300 nm to 400 nm for a time of at least 2 minutes such that the article exhibits a difference in transmission of at least 2%, at least 3%, or at least 5%.

Embodiment 67 is the method of embodiment 66, wherein the time of exposing is at least 4 minutes, at least 5 minutes, at least 6 minutes, at least 8 minutes, at least 10 minutes, at least 12 minutes, at least 15 minutes, at least 20 minutes, at least 30 minutes, at least 45 minutes, or at least 60 minutes.

Embodiment 68 is the method of embodiment 66 or 67, further comprising ceasing the exposing to the light wavelengths for at least 4 minutes such that the article exhibits a difference in transmission of at least 2%, at least 3%, or at least 5%, compared to the activated transmission.

Embodiment 69 is the method of embodiment 68, wherein the time of ceasing the exposing to the light wavelengths is at least 5 minutes, at least 8 minutes, at least 10 minutes, at least 15 minutes, at least 20 minutes, at least 30 minutes, at least 45 minutes, at least 60 minutes, or at least 90 minutes.

Embodiment 70 is the method of any of embodiments 66 to 69, further comprising cycling between the exposing the photochromic article to the light wavelengths and the ceasing exposing the photochromic article to the light wavelengths, wherein the cycling comprises at least two cycles of each of the exposing the photochromic article to the light wavelengths and the ceasing the exposing the photochromic article to the light wavelengths and alternating between the exposing and the ceasing the exposing.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

Materials

| Material | Vendor |
| --- | --- |
| REVERSACOL OXFORD BLUE DYE | Vivimed Labs Ltd., Monmouth Junction, NJ, obtained under trade designation "REVERSACOL OXFORD BLUE DYE" |

| Material | Vendor |
| --- | --- |
| REVERSACOL MIDNIGHT GREY DYE | Vivimed Labs Ltd., Monmouth Junction, NJ, obtained under trade designation "REVERSACOL MIDNIGHT GREY DYE" |
| Polyethylene glycol 400 (PEG 400), solvent | Alfa Aesar, Ward Hill, MA |
| Dimethylsiloxane-ethylene oxide block copolymer (PDMS), (75% non-siloxane), solvent, viscosity of 20 centistokes (cSt) | Gelest Inc., Morrisville, PA |
| Bis-(2 ethylhexyl)-adipate (DEHA), solvent | Alfa Aesar, Ward Hill, MA |
| Dibutyl sebacate, solvent (DBS) | Alfa Aesar, Ward Hill, MA |
| Tributyl phosphate (TBP), solvent | J. T. Baker Chemical Company, Phillipsburg, NJ |
| NALCO 2327, colloidal silica dispersion | Nalco Company, Naperville, IL, obtained under trade designation "NALCO 2327" |
| SILQUEST A-174, silane | GE Advanced Materials, Wilton, CT, obtained under trade designation "SILQUEST A-174" |
| SILQUEST A-1230, silane | GE Advanced Materials, Wilton, CT, obtained under trade designation "SILQUEST A-1230" |
| 1-methoxy-2-propanol, solvent | Aldrich Chemical Company, Milwaukee, WI |
| SR444, pentaerythritol triacrylate, cross-linker | Sartomer Company, Exton, PA, obtained under trade designation "SR444" |
| IRGACURE 184, photoinitiator | Ciba Specialty Chemicals, Tarrytown, NY, obtained under trade designation "IRGACURE 184" |
| Isopropyl alcohol, solvent | Aldrich Chemical Company, Milwaukee, WI |
| SYLGARD 184, silicone elastomer base | Dow Chemical, Midland, MI, obtained under trade designation "SYLGARD 184" elastomer base |
| SYLGARD 184, silicone elastomer curing agent | Dow Chemical, Midland, MI, obtained under trade designation "SYLGARD 184" elastomer curing agent |
| Platinum (0)-1,3-divinyl-1,1,3,3-tetramethyldisiloxane complex, solution in vinyl-containing polydimethylsiloxane, catalyst | Alfa Aesar, Ward Hill, MA |
| Diphenyl(2,4,6-trimethylbenzoyl)phosphine oxide, photoinitiator | TCI, Portland, OR |
| 2-butanone, solvent | J. T. Baker Chemical Company, Phillipsburg, NJ |
| 1,6-hexanediol diacrylate | Aldrich Chemical Company, Milwaukee, WI |
| TEGO RAD 2250 | Evonik Industries, Parsippany, NJ, obtained under trade designation "TEGO RAD 2250" |
| Poly(methylmethacrylate) | Rohm & Haas, Philadelphia, PA |
| TINUVIN 477, UV absorber | BASF America, Florham Park, NJ, obtained under trade designation "TINUVIN 477" |
| TINUVIN 479, UV absorber | BASF America, Florham Park, NJ, obtained under trade designation "TINUVIN 479" |
| TINUVIN 123, hindered amine light stabilizer | BASF America, Florham Park, NJ, obtained under trade designation "TINUVIN 123" |
| IRGACURE 819, photoinitiator | Ciba Specialty Chemicals, Tarrytown, NY obtained under trade designation "IRGACURE 819" |
| DESMODUR 3600A, hexamethylene diisocyanate trimer | Covestro LLC, Pittsburgh, PA |
| AcMac, 1-acryoyloxy-3-methacryoyloxy-2-propanol, CAS number 1709-71-3 | TCI America, Portland, OR |
| DBTDL, dibutyltin dilaurate | Sigma-Aldrich, Milwaukee, WI |
| MEK, methyl ethyl ketone | Avantor Performance Materials, Center Valley, PA |

Methods

Preparation of DESMODUR 3600A-AcMac (940)

A three-necked 5-liter (5-L) round-bottom flask equipped with overhead stirrer was charged with 916.02 grams (g) (5.06 equivalents (eq)) DESMODUR 3600A, 400 g MEK, and 1 g of DBTDL and placed in a water bath under dry air. The flask was outfitted with a temperature probe, and 1083.97 g (5.06 eq) AcMac was added via addition funnel over about 1 hour (h). The addition funnel was rinsed with 100 g MEK and was replaced with a reflux condenser. When the reaction had reached its maximum temperature and started to drop in temperature, the water bath was removed and the reaction was placed in an oil bath and heated at 60° C. until analysis of the reaction by FTIR showed no residual—NCO peak at approximately 2265 cm$^{-1}$. The reaction was then adjusted to 80 wt-% solids with MEK and bottled.

Method for Fabrication of Nanovoided Film

In a 2-L three-neck flask, equipped with a condenser and a thermometer, 309 g of NALCO 2327 (40 wt-% solid) and 300 g of 1-methoxy-2-propanol were mixed together under rapid stirring. After that, 9.5 g of SILQUEST A-174 and 19.0 g of SILQUEST A-1230 was added, and then the mixture was stirred for 10 minutes (min). The mixture was heated at 80° C. using a heating mantle for 1 h, then 400 g of additional 1-methoxy-2-propanol was added. The reaction was kept at 80° C. for 16 hours. The resulting solution was allowed to cool down to room temperature. Most of the water/1-methoxy-2-propanol (about 700 g) solvent was removed using a rotary evaporator under a 60° C. water bath, resulting in 48.7 wt-% SILQUEST A-174/SILQUEST A-1230 modified 20 nm silica clear dispersion in 1-methoxy-2-propanol. An amount of 63.4 g of the SILQUEST A-174/SILQUEST A1230 silica solution (as modified above), 20.5 g of SR 444, 1.32 g of the photoinitiator IRGACURE 184, and 87.1 g of isopropyl alcohol were mixed together by stirring to form a homogenous coating solution.

The coating solution was syringe-pumped at a rate of 5.4 cubic centimeters per minute (cc/min) into an 8 inch (in)

(20.3 centimeter (cm)) wide slot type coating die. The slot coating die uniformly distributed a 20.3 cm wide coating onto a substrate moving at 5 ft/min (152 cm/min). After coating, the coated substrate passed through an enclosure before entering the UV-LED polymerization apparatus containing a quartz window for passage of UV radiation. The coatings were then polymerized.

The UV-LED bank used in this step consisted of a rectangular array of 352 LEDs, 16 downweb by 22 crossweb (covering an area of 8 in by 8 in (20.3 cm by 20.3 cm) on two water-cooled heat sinks. Each LED (available from Cree, Inc., Durham, N.C.) operated at a nominal wavelength of 395 nm, running at 45 Volts at 10 Amps [0.108 J/cm$^2$]. The array was positioned above the cure chamber quartz window at a distance of approximately 2.54 cm from the substrate. The UV-LED cure chamber was supplied with 46.7 L/min (100 cubic feet per hour) of nitrogen from a downstream gas introduction device which resulted in approximately 150 parts per million (ppm) oxygen concentration in the chamber.

After UV-LED polymerization, the coating was transported to an oven operating at 150° F. (65.6° C.). The coating was post-cured using a Fusion Systems Model I300P configured with an H-bulb (available from Fusion UV Systems, Gaithersburg, Md.). The UV chamber was nitrogen inerted to approximately 50 ppm oxygen.

Preparative Example 1

In a 20-milliliter (mL) screw top vial, the REVERSACOL OXFORD BLUE DYE (0.0312 g) was dissolved in toluene (1.0429 g), then the polyethylene glycol 400 solvent (2.9998 g) was added such that it would be a 1 wt-% solution of the active photochromic dye after removal of the toluene. The REVERSACOL OXFORD BLUE DYE dissolved in the toluene with 1-2 minutes of vortex mixing and the polyethylene glycol was mixed with the solution. The toluene was removed using a rotary evaporator resulting in 1 wt-% REVERSACOL OXFORD BLUE DYE in polyethylene glycol. The solution became light blue after the dissolution of the REVERSACOL OXFORD BLUE DYE. The solution colored under exposure to broad spectrum light from a Xenon arc lamp with AM 1.5 filter (Newport 67005) and bleached or faded when the light source was removed.

Preparative Example 2

In a 20-mL screw top vial, the REVERSACOL OXFORD BLUE DYE (0.0316 g) was dissolved in toluene (0.7310 g), then the dimethylsiloxane-ethylene oxide block copolymer (75% non-siloxane) solvent (3.1174 g) was added such that it would be a 1 wt-% solution of the active photochromic dye after removal of the toluene. The REVERSACOL OXFORD BLUE DYE dissolved in the toluene with 1-2 minutes of vortex mixing, and the dimethylsiloxane-ethylene oxide block copolymer solvent mixed with the solution. The toluene was removed using a rotary evaporator resulting in 1 wt-% REVERSACOL OXFORD BLUE DYE in dimethylsiloxane-ethylene oxide block copolymer. The solution became light blue after the dissolution of the REVERSACOL OXFORD BLUE DYE. The solution colored under exposure to broad spectrum light from a Xenon arc lamp with AM 1.5 filter (Newport 67005) and bleached or faded when the light source was removed.

Preparative Example 3

In a 20-mL screw top vial, the REVERSACOL OXFORD BLUE DYE (0.1068 g) was dissolved in bis (2-ethylhexyl) adipate (10.0412 g) such that it was a 1 wt-% solution of the active photochromic dye. The REVERSACOL OXFORD BLUE DYE dissolved in the bis(2-ethylhexyl) adipate solvent with several hours of stirring. The solution became light blue after the dissolution of the REVERSACOL OXFORD BLUE DYE. The solution colored under exposure to broad spectrum light from a Xenon arc lamp with AM 1.5 filter (Newport 67005) and bleached or faded when the light source was removed.

Preparative Example 4

In a 20-mL screw top vial, the REVERSACOL OXFORD BLUE DYE (0.0148 g) was dissolved in toluene (0.2854 g), then the bis(2-ethylhexyl) adipate solvent (0.3018 g) was added such that it would be a 5 wt-% solution of the active photochromic dye after removal of the toluene. The REVERSACOL OXFORD BLUE DYE dissolved in the toluene with 1-2 minutes of vortex mixing and the bis(2-ethylhexyl) adipate was mixed with the solution. The toluene was removed using a rotary evaporator resulting in 5 wt-% REVERSACOL OXFORD BLUE DYE in bis(2-ethylhexyl) adipate. The solution became light blue after the dissolution of the REVERSACOL OXFORD BLUE DYE. The solution colored under exposure to broad spectrum light from a Xenon arc lamp with AM 1.5 filter (Newport 67005) and bleached or faded when the light source was removed.

Preparative Example 5

In a 20-mL screw top vial, the REVERSACOL OXFORD BLUE DYE (0.0290 g) was dissolved in toluene (0.7458 g), then the bis(2-ethylhexyl) adipate solvent (0.3348 g) was added such that it would be a 10 wt-% solution of the active photochromic dye after removal of the toluene. The REVERSACOL OXFORD BLUE DYE dissolved in the toluene with 1-2 minutes of vortex mixing and the bis(2-ethylhexyl) adipate was mixed with the solution. The toluene was removed using a rotary evaporator resulting in 10 wt-% oxford blue in bis(2-ethylhexyl) adipate. The solution became light blue after the dissolution of the oxford blue. The solutions colored under exposure to broad spectrum light from a Xenon arc lamp with AM 1.5 filter (Newport 67005) and bleached or faded when the light source was removed.

Preparative Examples 6 and 7

Preparative Examples 6 and 7 solutions were prepared in the same manner as Example 3 solution.

Preparative Example 8

In a 20-mL screw top vial, the REVERSACOL OXFORD BLUE DYE (0.1010 g) was dissolved in dibutyl sebacate (10.0361 g) such that it was a 1 wt-% solution of the active photochromic dye. The REVERSACOL OXFORD BLUE DYE dissolved in the dibutyl sebacate solvent with several hours of stirring. The solution became light blue after the dissolution of the REVERSACOL OXFORD BLUE DYE. The solution colored under exposure to broad spectrum light from a Xenon arc lamp with AM 1.5 filter (Newport 67005) and bleached or faded when the light source was removed.

Preparative Example 9

In a 20-mL screw top vial, the REVERSACOL OXFORD BLUE DYE (0.0144 g) was dissolved in toluene (0.2878 g), then the dibutyl sebacate solvent (0.3401 g) was added such that it would be a 5 wt-% solution of the active photochromic dye after removal of the toluene. The REVERSACOL OXFORD BLUE DYE dissolved in the toluene with 1-2 minutes of vortex mixing and the dibutyl sebacate was mixed with the solution. The toluene was removed using a rotary evaporator resulting in 5 wt-% REVERSACOL OXFORD BLUE DYE in dibutyl sebacate. The solution became light blue after the dissolution of the oxford blue. The solutions colored under exposure to broad spectrum light from a Xenon arc lamp with AM 1.5 filter (Newport 67005) and bleached or faded when the light source was removed.

Preparative Example 10

In a 20-mL screw top vial, the REVERSACOL OXFORD BLUE DYE (0.0328 g) was dissolved in toluene (0.7473 g), then the dibutyl sebacate solvent (0.2971 g) was added such that it would be a 10 wt-% solution of the active photochromic dye after removal of the toluene. The REVERSACOL OXFORD BLUE DYE dissolved in the toluene with 1-2 minutes of vortex mixing and the dibutyl sebacate solvent was mixed with the solution. The toluene was removed using a rotary evaporator resulting in 10 wt-% REVERSACOL OXFORD BLUE DYE in dibutyl sebacate. The solution became light blue after the dissolution of the REVERSACOL OXFORD BLUE DYE. The solutions colored under exposure to broad spectrum light from a Xenon arc lamp with AM 1.5 filter (Newport 67005) and bleached or faded when the light source was removed.

Preparative Example 11

In a 20-mL screw top vial, the REVERSACOL OXFORD BLUE DYE (0.0507 g) was dissolved in tributyl phosphate (5.0191 g) such that it was a 1 wt-% solution of the active photochromic dye. The REVERSACOL OXFORD BLUE DYE dissolved in the tributyl phosphate solvent with several hours of stirring. The solution became light blue after the dissolution of the REVERSACOL OXFORD BLUE DYE. The solution colored under exposure to broad spectrum light from a Xenon arc lamp with AM 1.5 filter (Newport 67005) and bleached or faded when the light source was removed.

Preparative Example 12

In a 20-mL screw top vial, the REVERSACOL OXFORD BLUE DYE (0.0156 g) was dissolved in toluene (0.2935 g), then the tributyl phosphate solvent (0.3214 g) was added such that it would be a 5 wt-% solution of the active photochromic dye after removal of the toluene. The REVERSACOL OXFORD BLUE DYE dissolved in the toluene with 1-2 minutes of vortex mixing, and the tributyl phosphate solvent mixed with the solution readily. The toluene was removed using a rotary evaporator resulting in 5 wt-% oxford blue in tributyl phosphate. The solution became light blue after the dissolution of the REVERSACOL OXFORD BLUE DYE. The solutions colored under exposure to broad spectrum light from a Xenon arc lamp with AM 1.5 filter (Newport 67005) and bleached or faded when the light source was removed.

Preparative Example 13

In a 5-mL screw top vial, the REVERSACOL MIDNIGHT GREY DYE (0.0100 g) was dissolved in dibutyl sebacate (1.005 g) such that it was a 1 wt-% solution of the active photochromic dye. The REVERSACOL MIDNIGHT GREY DYE dissolved readily in the dibutyl sebacate solvent with 30 minutes in the ultrasonic bath at 40° C. The solution became light grey after the dissolution of the REVERSACOL MIDNIGHT GREY DYE. The solution colored under exposure to broad spectrum light from a Xenon arc lamp with AM 1.5 filter (Newport 67005) and bleached or faded when the light source was removed.

Preparative Example 14

In a 20-mL screw top vial, the REVERSACOL MIDNIGHT GREY DYE (0.01497 g) was dissolved in toluene (0.5589 g), then the polyethylene glycol 400 solvent (1.50831 g) was added such that it would be a 1 wt-% solution of the active photochromic dye after removal of the toluene. The REVERSACOL MIDNIGHT GREY DYE dissolved in the toluene with 1-2 minutes of vortex mixing and the polyethylene glycol 400 was mixed with the solution. The toluene was removed using a rotary evaporator resulting in 1 wt-% REVERSACOL MIDNIGHT GREY DYE in polyethylene glycol 400. The solution became light grey after the dissolution of the REVERSACOL MIDNIGHT GREY DYE. The solution colored under exposure to broad spectrum light from a Xenon arc lamp with AM 1.5 filter (Newport 67005) and bleached or faded when the light source was removed.

Films of Preparative Examples 1-14

Each of Examples 1-14 solutions were drop cast onto a porous acrylic films of varying thicknesses. The films, also known as ultra-low index films (ULI), were prepared using the process described above in "Method for fabrication of nanovoided film." The haze of the wet film (determined by visual inspection) was greatly reduced compared to unfilled nanovoided film such that they were essentially clear. The solution was applied to the film with a plastic spreader and the excess solvent was removed with a KIM WIPE tissue.

The resulting films infused with high boiling point solutions of organic dyes colored when irradiated with UV light.

Examples 15-16

Example 15 and 16 solutions were prepared in the same manner as Preparative Examples 1 and 14, respectively. Then, each of the Example 15 and 16 solutions were drop cast onto 35 micrometer thick porous acrylic films (prepared using the process described above in "Method for fabrication of nanovoided film") in the same manner as described above for Examples 1-14. The haze of the wet films was greatly reduced compared to unfilled nanovoided films such that they were essentially clear.

Liquid infused films of Example 15-16 colored when irradiated with UV light.

In a 20-mL screw top bottle, SYLGARD 184 curing agent (0.5008 g) was added to the SYLGARD 184 base (5.1036 g), then 1.0054 grams of a mixture of xylenes (4.9985 g) and platinum (0)-1,3-divinyl-1,1,3,3-tetramethyldisiloxane as a polydimethylsiloxane solution (0.0470 g) was added such that the SYLGARD 184 mixture would be viscous and would cure in a thin layer via the added platinum catalyst. The xylenes solution was mixed into the silicone base with 1-2 minutes of vortex mixing. The resulting solution was coated onto the liquid infused nanovoided films of Examples 15 and 16 prepared above with a number eight wire wound rod from RD Specialties Webster, N.Y., and placed in an oven at 60° C. for an hour.

Examples 17-18

Example 17 and 18 solutions were prepared in the same manner as Preparative Examples 1 and 14, respectively. Then, each of the Example 17 and 18 solutions were drop cast onto 35 micrometer thick porous acrylic films (prepared using the process described above in "Method for fabrication of nanovoided film") in the same manner as described above for Examples 1-14. The haze of the wet films was greatly reduced compared to unfilled nanovoided films such that they were essentially clear.

Liquid infused films of Example 17 and Example 18 colored when irradiated with UV light.

In a 20-mL screw top bottle, IRGACURE 184 photoinitiator (0.0520 g) and diphenyl(2,4,6-trimethylbenzoyl)phosphine oxide (0.051 g) were added to "top-coat 1" (5.034 g). Top-coat 1 consisted of 2-butanone (25.55 g), 1-methoxy-2-propanol (33.73 g), 1,6-hexanediol diacrylate (32.53 g), TEGO RAD 2250 (4.89 g), TINUVIN 477 (1.09 g), TINUVIN 479 (1.09 g), TINUVIN 123 (340 milligrams (mg)), 1-hydroxycyclohexyl phenyl ketone (370 mg), and phenylbis(2,4,6-trimethylbenzoyl) phosphine oxide (370 mg). The photoinitiators dissolved in the top-coat 1 mixture with 60 minutes of stirring on a magnetic stir plate. The solution was coated onto the liquid infused nanovoided films of Examples 17 and 18 with a number eight wire wound rod from RD Specialties Webster, N.Y. and then placed in an oven at 60° C. for fifteen minutes to evaporate the solvents. The top coat 1 was cured by running through a UV processor (Fusion UV Systems Inc. MC-6RQN, 100% Power, nitrogen atmosphere).

Example 19

The Example 19 solution was prepared in the same manner as Preparative Examples 1. Then, the solution was drop cast onto 35 micrometer thick porous acrylic films (prepared using the process described above in "Method for fabrication of nanovoided film") in the same manner as described above for Examples 1-14. The haze of the wet films was greatly reduced compared to unfilled nanovoided films such that they were essentially clear.

Liquid infused films of Example 19 colored when irradiated with UV light.

In a 20 mL screw top bottle, 1-hydroxycyclohexyl phenyl ketone catalyst (0.0455 g) and phenylbis(2,4,6-trimethylbeznoyl) phosphine oxide (0.0511 g) were added to the urethane top-coat (5.0346 g). The urethane top coat consisted of DESMODUR 3600A-AcMac (prepared using the process described above in "Preparation of DESMODUR 3600A-AcMac (940)"). The catalysts dissolved in the mixture with 60 minutes of stirring on a magnetic stir plate. The solution was coated onto the liquid infused nanovoided film of Example 19 with a number eight wire wound rod from RD Specialties Webster, N.Y. and placed in an oven at 60° C. for fifteen minutes to evaporate solvents. The top coat was cured by running through a UV processor (Fusion UV Systems Inc. MC-6RQN, 100% Power, nitrogen atmosphere).

Table 1, below, summarizes the thickness of the porous matrix, the solvent, dye and the concentration of the dye in solution as well as the type of top coating applied for each of Preparative Examples 1-14 and Examples 15-19.

TABLE 1

| Preparative Example/ Example | Porous Matrix Thickness (μm) | Solvent | Dye | Concentration of dye in Solution (wt. %) | Top Coat |
|---|---|---|---|---|---|
| Prep. Ex. 1 | 35 | PEG 400 | Oxford Blue | 1 | N/A |
| Prep. Ex. 2 | 35 | PDMS | Oxford Blue | 1 | N/A |
| Prep. Ex. 3 | 35 | DEHA | Oxford Blue | 1 | N/A |
| Prep. Ex. 4 | 35 | DEHA | Oxford Blue | 5 | N/A |
| Prep. Ex. 5 | 35 | DEHA | Oxford Blue | 10 | N/A |
| Prep. Ex. 6 | 13 | DEHA | Oxford Blue | 1 | N/A |
| Prep. Ex. 7 | 55 | DEHA | Oxford Blue | 1 | N/A |
| Prep. Ex. 8 | 35 | DBS | Oxford Blue | 1 | N/A |
| Prep. Ex. 9 | 35 | DBS | Oxford Blue | 5 | N/A |
| Prep. Ex. 10 | 35 | DBS | Oxford Blue | 10 | N/A |
| Prep. Ex. 11 | 35 | TBP | Oxford Blue | 1 | N/A |
| Prep. Ex. 12 | 35 | TBP | Oxford Blue | 5 | N/A |
| Prep. Ex. 13 | 35 | DBS | Midnight Grey | 1 | N/A |
| Prep. Ex. 14 | 35 | PEG 400 | Midnight Grey | 1 | N/A |
| Ex. 15 | 35 | PEG 400 | Midnight Grey | 1 | SYLGARD 184 |
| Ex. 16 | 35 | PEG 400 | Oxford Blue | 1 | SYLGARD 184 |
| Ex. 17 | 35 | PEG 400 | Midnight Grey | 1 | Top-coat 1 |
| Ex. 18 | 35 | PEG 400 | Oxford Blue | 1 | Top-coat 1 |
| Ex. 19 | 35 | PEG 400 | Midnight Grey | 1 | Urethane top-coat |

N/A means not applied

Photochromic Dye Kinetic Measurement Procedure

Sample films from Preparative Examples 1-14 and Examples 15-19 were irradiated with a xenon arc lamp (Newport 67005 with AM 1.5 filter, about 4 mJ·cm$^{-2}$·s$^{-1}$) until no significant change in coloration occurred. The lamp was then turned off until the sample fully returned to its uncolored state. This cycle was repeated and the transmission of the film at a specific wavelength (615 nm) was monitored by UV-vis spectrophotometry (Ocean Optics USB2000+, Dunedin, Fla.). The samples were observed over several cycles. In most cases, nearly full coloration and bleaching occurred in less than 60 seconds. There are two different representations of this data in Table 2. The measurement for "Time of A20% Coloration/Fading" is the time (in seconds) it takes for a change of 20% of the absolute transmission. For samples that did not have at least a 20% difference in transmission between the activated and unactivated states this parameter does not apply (i.e., N/A). The measurement for "Initial Rate of Coloring/Fading" is the initial slope of the transmission versus time curve.

Optical Measurement Procedure

The optical measurements of transmission, haze, and clarity (in the colorless state only) were made using a BYK Gardner haze-gard plus 4725 instrument (Geretsried, Germany). The BYK instrument uses an illuminant "C" source and measures all the light over that spectral range to calculate a transmission value. Haze was the percentage of transmitted light that deviated from the incident beam by more than 2.5°. Clarity was evaluated at angles of less than 2.5°. The results are shown in Table 2.

TABLE 2

| Preparative Example/ Example | Transmission (%) (colorless state) | Haze (%) (colorless state) | Clarity (%) (colorless state) | ΔT (%) | Time of Δ20% Coloration (seconds) | Time of Δ20% Fading (seconds) | Initial Rate of Coloring (dT/dt, sec$^{-1}$) | Initial Rate of Fading (dT/dt, sec$^{-1}$) |
|---|---|---|---|---|---|---|---|---|
| Prep. Ex. 1 | 90.4 | 5.29 | 99.7 | 31.19 | 1.79 | 4.13 | −12.1 | 5.99 |
| Prep. Ex. 2 | 89.9 | 5.82 | 98.8 | 14.32 | N/A | N/A | −7.99 | 4.55 |
| Prep. Ex. 3 | 88.6 | 4.64 | 98.6 | 17.85 | N/A | N/A | −12.4 | 5.51 |
| Prep. Ex. 4 | 89.8 | 2.84 | 97.8 | 29.8 | 2.3 | 3.50 | −18.9 | 7.03 |
| Prep. Ex. 5 | 89.8 | 7.33 | 94.3 | 34.03 | 1.0 | 2.37 | −20.28 | 7.53 |
| Prep. Ex. 6 | 91.1 | 0.73 | 99.3 | 8.643 | N/A | N/A | −4.83 | 2.21 |
| Prep. Ex. 7 | 83.3 | 3.54 | 99.1 | 21.47 | 12.23 | 35.62 | −7.23 | 4.53 |
| Prep. Ex. 8 | 90.3 | 4.95 | 98.3 | 18.87 | N/A | N/A | −5.44 | 5.02 |
| Prep. Ex. 9 | 87.8 | 8.94 | 94.2 | 25.2 | 1.15 | 4.60 | −18.50 | 6.33 |
| Prep. Ex. 10 | 91.1 | 7.54 | 91.0 | 29.91 | .75 | 2.48 | −12.32 | 8.79 |
| Prep. Ex. 11 | 89.6 | 3.12 | 97.2 | 4.83 | N/A | N/A | −3.27 | 2.56 |
| Prep. Ex. 12 | 90.5 | 9.93 | 99.5 | 19.72 | N/A | 8.83 | −19.15 | 6.64 |
| Prep. Ex. 13 | 89.4 | 5.61 | 99.8 | 46.51 | 4.18 | 19.10 | −7.29 | 4.53 |
| Prep. Ex. 14 | 87.7 | 2.87 | 99.1 | 56.87 | 3.71 | 14.09 | −6.22 | 1.77 |
| Ex. 15 | 86.8 | 4.92 | 91.8 | 42.37 | 6.49 | 22.71 | −3.46 | 1.04 |
| Ex. 16 | 89.1 | 5.67 | 97.2 | 3.35 | N/A | N/A | −0.20 | 0.51 |
| Ex. 17 | 77.7 | 24.6 | 56.4 | 19.21 | N/A | N/A | −0.87 | 0.55 |
| Ex. 18 | 89.1 | 25.9 | 69.0 | 4.99 | N/A | N/A | −3.08 | 1.06 |
| Ex. 19 | 85.2 | 0.60 | 99.7 | 35.44 | 9.91 | 35.104 | −2.58 | 1.00 |

N/A means the parameter does not apply because the overall change in transmission is less than 20%

For Examples 15 through 19, the rates of coloration and bleaching have decreased presumably due to the reduced mobility of the photochromic dye after deposition of the barrier layer. It is envisioned that Preparative Examples 2-13 can be prepared with a barrier layer as described in Examples 15-19.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A photochromic article comprising:
   a structural component comprising a polymeric material that is porous, includes a plurality of cavities, or a combination thereof;
   a fluid in contact with the structural component, wherein the fluid comprises a polyalkylene oxide, a polysiloxane, a solvent having a boiling point of 200° C. or higher, or a combination thereof;
   a photochromic organic dye in contact with the fluid; and
   a barrier layer disposed on the structural component to provide a barrier for the fluid and photochromic organic dye therein;
   wherein the article is photochromic.

2. The photochromic article of claim 1, wherein the photochromic article is transparent over an entire wavelength range of 390 nm to 700 nm.

3. The photochromic article of claim 1, wherein at least a portion of the photochromic organic dye is dissolved in the fluid.

4. The photochromic article of claim 1, wherein the structural component has two major surfaces and a barrier layer is disposed on each of the major surfaces of the structural component.

5. The photochromic article of claim 1, further comprising a transparent support substrate disposed on a first major surface of the structural component.

6. The photochromic article of claim 1, wherein the photochromic organic dye is selected from a spiropyran, spirooxazine, a naphthopyran, and a combination thereof.

7. The photochromic article of claim 1, wherein the barrier layer is a coating.

8. The photochromic article of claim 1, wherein the barrier layer is a film.

9. The photochromic article of claim 1, wherein the article exhibits a difference in transmission of at least 2% after exposure to light wavelengths of 300 nm to 400 nm for a time of at least 2 minutes.

10. The photochromic article of claim 1, wherein the photochromic article comprises a haze, according to the Optical Measurement Procedure, of less than 30%.

11. The photochromic article of claim 1, wherein the photochromic article comprises an activation speed of no more than 3 minutes.

12. The photochromic article of claim 1, wherein the photochromic article comprises a half-life of no more than 3 minutes.

13. A method of forming a photochromic article comprising:
   distributing a photochromic organic dye in a fluid, wherein the fluid comprises a polyalkylene oxide, a polysiloxane, a solvent having a boiling point of 200° C. or higher, or a combination thereof;
   placing the fluid in contact with a structural component, wherein the structural component comprises a polymeric material that is porous, includes a plurality of cavities, or a combination thereof; and placing a barrier layer on the structural component to provide a barrier for the fluid and photochromic organic dye;

wherein the article is photochromic.

14. A method of changing a light transmission of a photochromic article comprising:

providing a photochromic article comprising:

a structural component comprising a polymeric material that is porous, includes a plurality of cavities, or a combination thereof;

a fluid in contact with the structural component, wherein the fluid comprises a polyalkylene oxide, a polysiloxane, a solvent having a boiling point of 200° C. or higher, or a combination thereof;

a photochromic organic dye in contact with the fluid; and a barrier layer disposed on the structural component to provide a barrier for the fluid and photochromic organic dye; and exposing the photochromic article to light wavelengths of 300 nm to 400 nm for a time of at least 2 minutes such that the article exhibits a difference in transmission of at least 2%.

* * * * *

UNITED STATES PATENT AND TRADEMARK OFFICE
CERTIFICATE OF CORRECTION

PATENT NO. : 11,054,558 B2
APPLICATION NO. : 16/342239
DATED : July 6, 2021
INVENTOR(S) : Miller et al.

It is certified that error appears in the above-identified patent and that said Letters Patent is hereby corrected as shown below:

In the Specification

Column 3, Line 46, Delete "W" and insert -- $R^a$ --, therefor.

Column 3, Line 49, Delete "W" and insert -- $R^a$ --, therefor.

Column 4, Line 17, Delete "of'" and insert -- of." --, therefor.

Column 7, Line 41, Delete "PFCO20-ECTFE 0.2 UM" and insert -- PFC020-ECTFE 0.2UM --, therefor.

Column 10, Line 2, Delete "for the" and insert -- for the $R^4$ --, therefor.

Column 10, Line 8, Delete "for the" and insert -- for the $R^4$ --, therefor.

Column 11, Line 65, Delete "the $R^{19}$" and insert -- the $R^{14}$ --, therefor.

Column 14, Line 34, Delete "tetramethyldisilozane]" and insert -- tetramethyldisiloxane] --, therefor.

Column 14, Line 36, Delete "tetramethyldisilozane]" and insert -- tetramethyldisiloxane] --, therefor.

Column 14, Line 38, Delete "tetramethyldisilozane]" and insert -- tetramethyldisiloxane] --, therefor.

Column 26, Line 35, Delete "$sec^1$." and insert -- $sec^{-1}$. --, therefor.

Column 26, Line 39, Delete "$sec^1$." and insert -- $sec^{-1}$. --, therefor.

Column 26, Line 59, Delete "thereof" and insert -- thereof; --, therefor.

Column 29-30, Line 52, Delete "1-acryoyloxy" and insert -- 1-acryloyloxy --, therefor.

Signed and Sealed this
First Day of August, 2023

*Katherine Kelly Vidal*
*Director of the United States Patent and Trademark Office*

CERTIFICATE OF CORRECTION (continued)
U.S. Pat. No. 11,054,558 B2

Column 29-30, Line 52, Delete "methacryoyloxy-2-" and insert -- methacryloyloxy-2- --, therefor.

Column 31, Line 1, Delete "die." and insert -- dye. --, therefor.

Column 31, Line 2, Delete "die" and insert -- dye --, therefor.

Column 36, Line 8, Delete "beznoyl)" and insert -- benzoyl) --, therefor.